(12) United States Patent
Nagano et al.

(10) Patent No.: US 10,866,415 B2
(45) Date of Patent: Dec. 15, 2020

(54) HEAD-UP DISPLAY APPARATUS

(71) Applicant: MAXELL, LTD., Kyoto (JP)

(72) Inventors: Yuki Nagano, Kyoto (JP); Takumi Nakada, Kyoto (JP); Maki Hanada, Kyoto (JP); Akio Misawa, Kyoto (JP); Souta Sato, Kyoto (JP)

(73) Assignee: MAXELL, LTD., Kyoto (JP)

( * ) Notice: Subject to any disclaimer, the term of this patent is extended or adjusted under 35 U.S.C. 154(b) by 210 days.

(21) Appl. No.: 16/071,518

(22) PCT Filed: Oct. 20, 2016

(86) PCT No.: PCT/JP2016/081124
§ 371 (c)(1),
(2) Date: Jul. 20, 2018

(87) PCT Pub. No.: WO2017/134865
PCT Pub. Date: Aug. 10, 2017

(65) Prior Publication Data
US 2019/0025580 A1 Jan. 24, 2019

(30) Foreign Application Priority Data

Feb. 5, 2016 (JP) ................................ 2016-020471
Mar. 17, 2016 (JP) ................................ 2016-053181
Mar. 18, 2016 (JP) ................................ 2016-054581

(51) Int. Cl.
*G02B 27/01* (2006.01)
*B60K 35/00* (2006.01)
(Continued)

(52) U.S. Cl.
CPC .......... *G02B 27/0101* (2013.01); *B60K 35/00* (2013.01); *B60R 1/00* (2013.01);
(Continued)

(58) Field of Classification Search
CPC ................ G02B 27/0101; G02B 27/01; G02B 27/0149; B60K 35/00; B60R 1/00;
(Continued)

(56) References Cited

U.S. PATENT DOCUMENTS 8,867,138 B2 * 10/2014 Kobayashi ......... G02B 27/0101
359/630
9,817,237 B2 11/2017 Kutomi
(Continued)

FOREIGN PATENT DOCUMENTS

JP 0207533 U 6/1990
JP 04109325 U 9/1992
(Continued)

OTHER PUBLICATIONS

Japanese Office Action received in corresponding Japanese Application No. 2017-565394 dated Jul. 2, 2019.
(Continued)

*Primary Examiner* — James R Greece
(74) *Attorney, Agent, or Firm* — Mattingly & Malur, PC

(57) ABSTRACT

A head-up display apparatus displays a virtual image suitably overlapped with actual scenery in accordance with a running condition of a vehicle. The head-up display apparatus acquires various kinds of vehicle information which can be detected by a vehicle and the display of the video image is based on the vehicle information. A mirror is configured to reflect the video image formed by the video image display to project onto the windshield. A mirror driver is configured to change an angle of the mirror and a display distance adjusting mechanism is configured to adjust a display distance of the virtual image with respect to the driver. The angle of the mirror is adjusted via the mirror (Continued)

driver based on the vehicle information such that the virtual image can be displayed with respect to the driver to be overlapped with the scenery.

11 Claims, 33 Drawing Sheets

(51) Int. Cl.
| | | |
|---|---|---|
| *G09G 3/00* | (2006.01) | |
| *H04N 9/31* | (2006.01) | |
| *B60R 1/00* | (2006.01) | |
| *G01C 21/36* | (2006.01) | |

(52) U.S. Cl.
CPC ........... *G01C 21/365* (2013.01); *G02B 27/01* (2013.01); *G02B 27/0149* (2013.01); *G09G 3/002* (2013.01); *H04N 9/3185* (2013.01); *H04N 9/3194* (2013.01); *B60K 2370/1529* (2019.05); *B60K 2370/23* (2019.05); *B60K 2370/334* (2019.05); *B60K 2370/52* (2019.05); *B60R 2300/205* (2013.01); *B60R 2300/308* (2013.01); *G02B 2027/014* (2013.01); *G02B 2027/0154* (2013.01); *G09G 2320/0626* (2013.01); *G09G 2340/0471* (2013.01)

(58) Field of Classification Search
CPC .... G01C 21/365; G09G 3/002; H04N 9/3185; H04N 9/3194
USPC .......................................................... 359/630
See application file for complete search history.

(56) References Cited

U.S. PATENT DOCUMENTS

| | | | |
|---|---|---|---|
| 2007/0198183 A1 | 8/2007 | Morimoto et al. | |
| 2010/0253489 A1* | 10/2010 | Cui | G01S 13/867 340/425.5 |
| 2010/0253492 A1* | 10/2010 | Seder | G02B 27/01 340/435 |
| 2010/0253493 A1* | 10/2010 | Szczerba | G08G 1/167 340/435 |
| 2010/0253526 A1* | 10/2010 | Szczerba | G01S 13/867 340/576 |
| 2010/0253539 A1* | 10/2010 | Seder | G08G 1/0962 340/903 |
| 2010/0253540 A1* | 10/2010 | Seder | G01S 13/931 340/905 |
| 2010/0253541 A1* | 10/2010 | Seder | G08G 1/168 340/905 |
| 2010/0253542 A1* | 10/2010 | Seder | G01S 13/867 340/932.2 |
| 2010/0253543 A1* | 10/2010 | Szczerba | G01S 13/723 340/932.2 |
| 2010/0253594 A1* | 10/2010 | Szczerba | B60J 1/00 345/7 |
| 2010/0253595 A1* | 10/2010 | Szczerba | G01S 13/931 345/7 |
| 2010/0253598 A1* | 10/2010 | Szczerba | G01S 13/723 345/7 |
| 2010/0253599 A1* | 10/2010 | Szczerba | G02B 27/01 345/7 |
| 2010/0253600 A1* | 10/2010 | Seder | B32B 17/10761 345/7 |
| 2010/0253602 A1* | 10/2010 | Szczerba | G01S 13/931 345/8 |
| 2010/0253918 A1* | 10/2010 | Seder | G01S 13/867 353/13 |
| 2010/0289632 A1* | 11/2010 | Seder | G06K 9/00805 340/436 |
| 2010/0292886 A1* | 11/2010 | Szczerba | G01S 13/723 701/31.4 |
| 2011/0134498 A1 | 6/2011 | Ohta et al. | |
| 2016/0054735 A1* | 2/2016 | Switkes | H04W 4/44 701/23 |
| 2016/0216521 A1 | 7/2016 | Yachida et al. | |

FOREIGN PATENT DOCUMENTS

| | | |
|---|---|---|
| JP | 2004-168230 A | 6/2004 |
| JP | 2005-035384 A | 2/2005 |
| JP | 2006-007867 A | 1/2006 |
| JP | 2007-055365 A | 3/2007 |
| JP | 2009-113710 A | 5/2009 |
| JP | 2009-178404 A | 8/2009 |
| JP | 2011-064902 A | 3/2011 |
| JP | 2011-123126 A | 6/2011 |
| JP | 2011-164631 A | 8/2011 |
| JP | 2013-237320 A | 11/2013 |
| JP | 2014-10418 A | 1/2014 |
| JP | 2015-080988 A | 4/2015 |
| JP | 2015-087512 A | 5/2015 |
| JP | 2015-200770 A | 11/2015 |
| JP | 2015-202842 A | 11/2015 |
| WO | 2012/118125 A1 | 9/2012 |

OTHER PUBLICATIONS

International Search Report of PCT/JP2016/081124 dated Dec. 6, 2016.
Japanese Office Action received in corresponding Japanese Application No. 2017-565393 dated Nov. 5, 2019.

* cited by examiner

FIG. 12
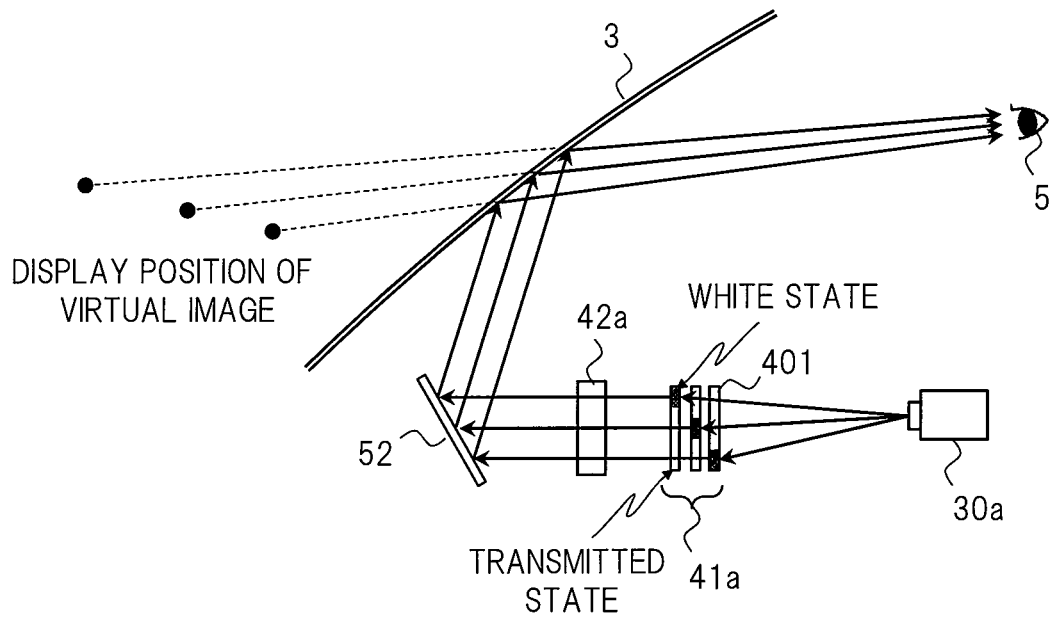
(a)
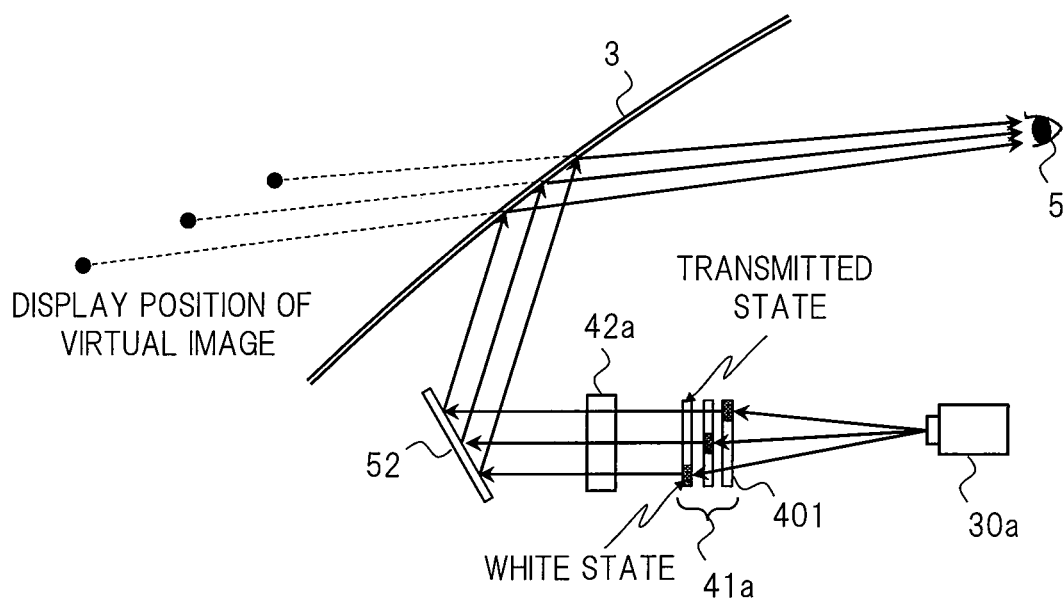
(b)

FIG. 16
(a)
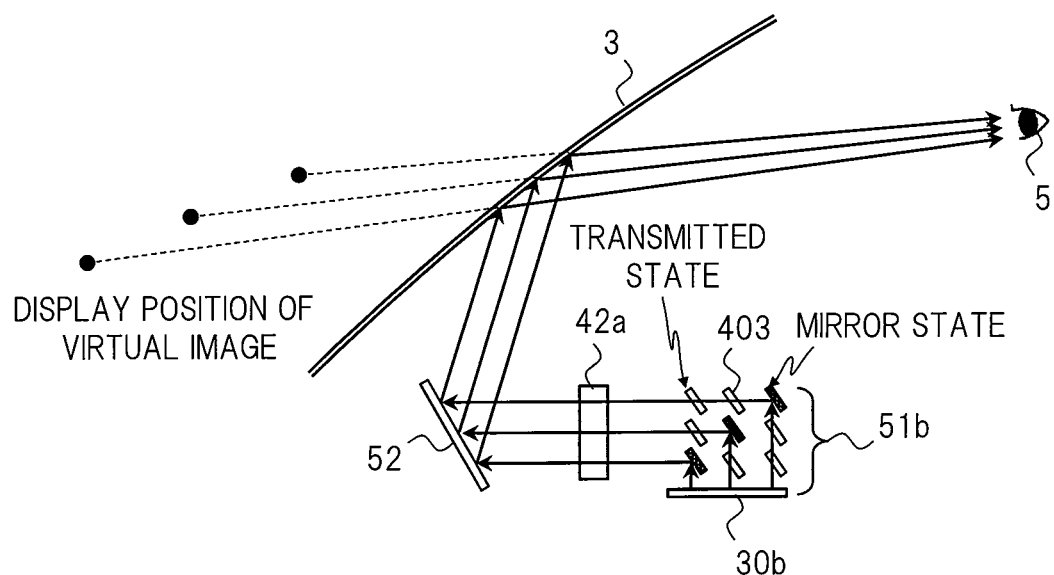
(b)
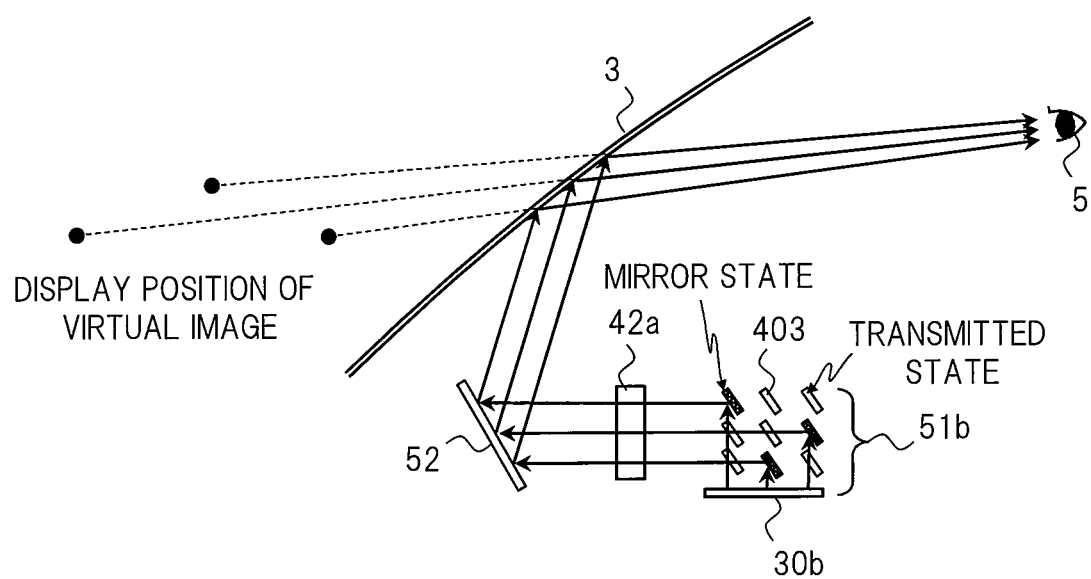

FIG. 19
(a)
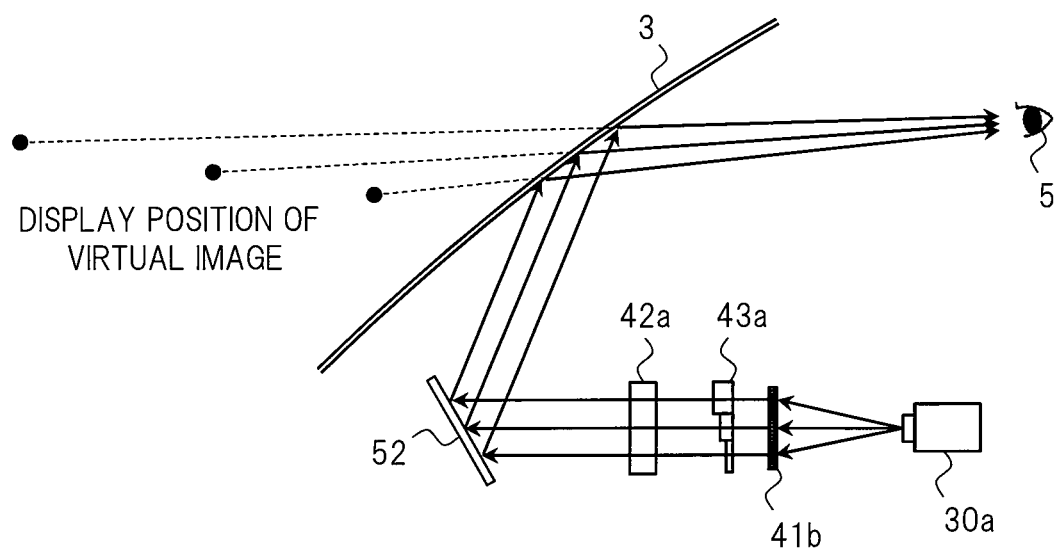
(b)
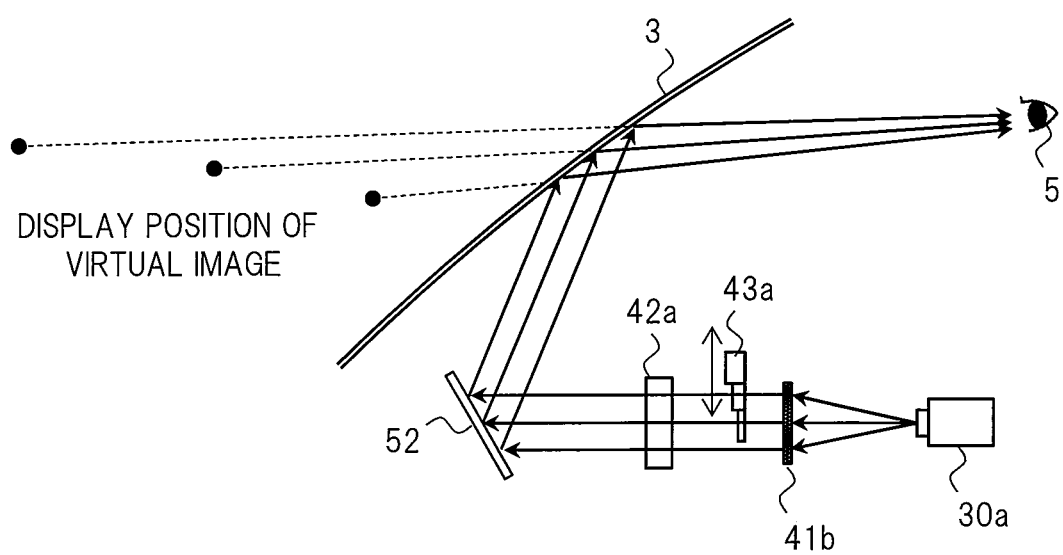

FIG. 22
AROUND TOP OF ASCENDING SLOPE
(a)
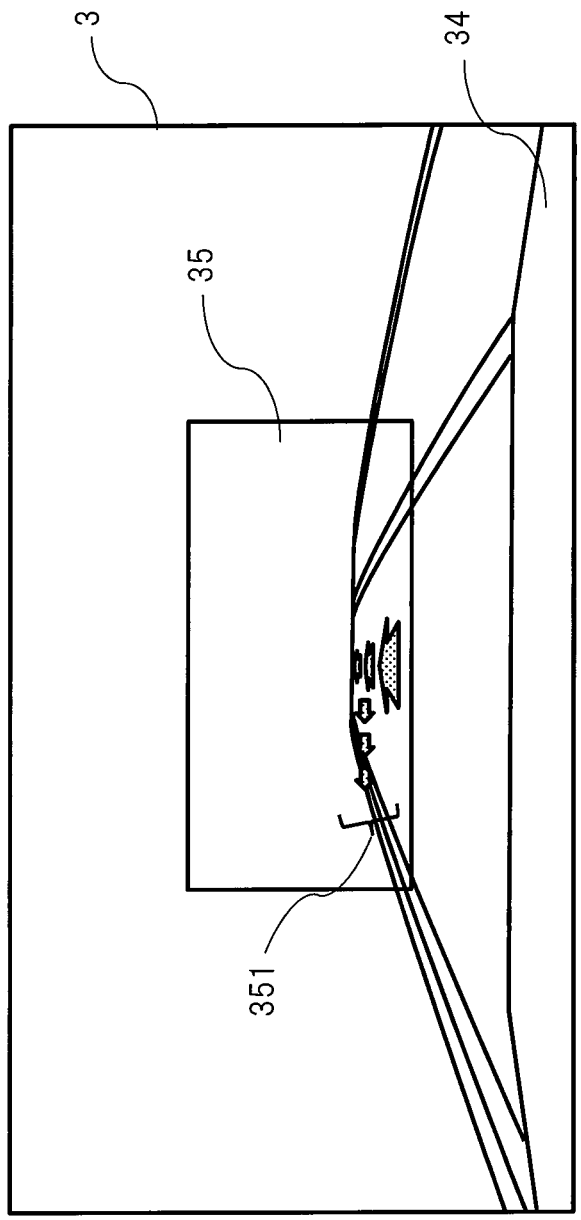
(b)
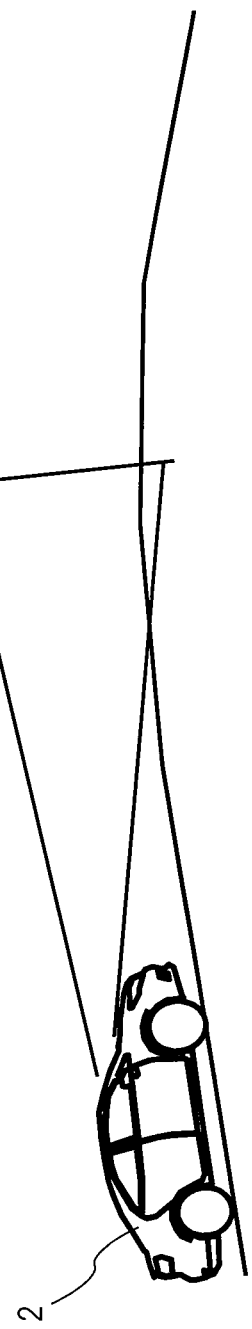

AROUND END OF DESCENDING SLOPE

CURVE

SLOPE

FIG. 26
COUNTERMEASURE AROUND TOP OF ASCENDING SLOPE (1)
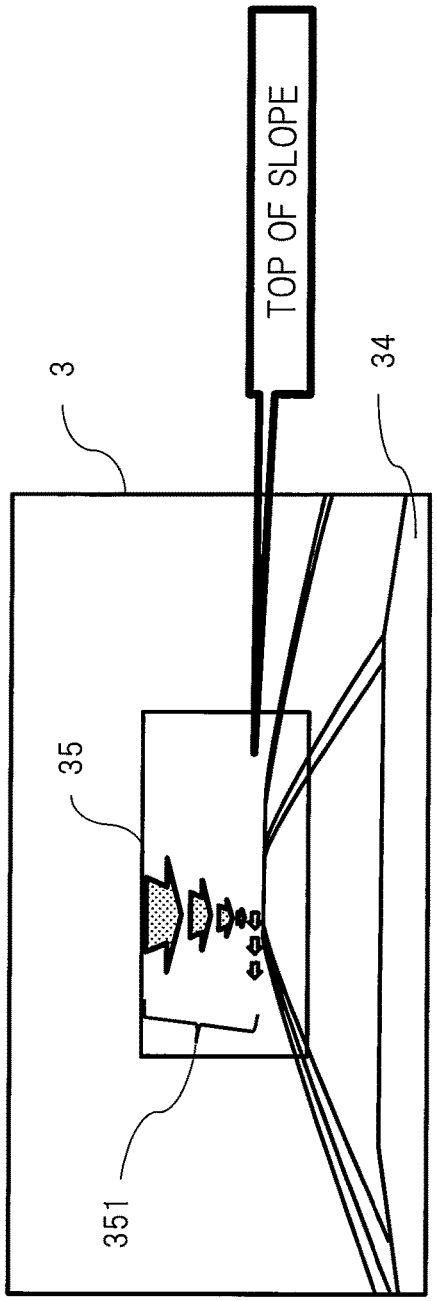
(a) CASE OF TURNING LEFT
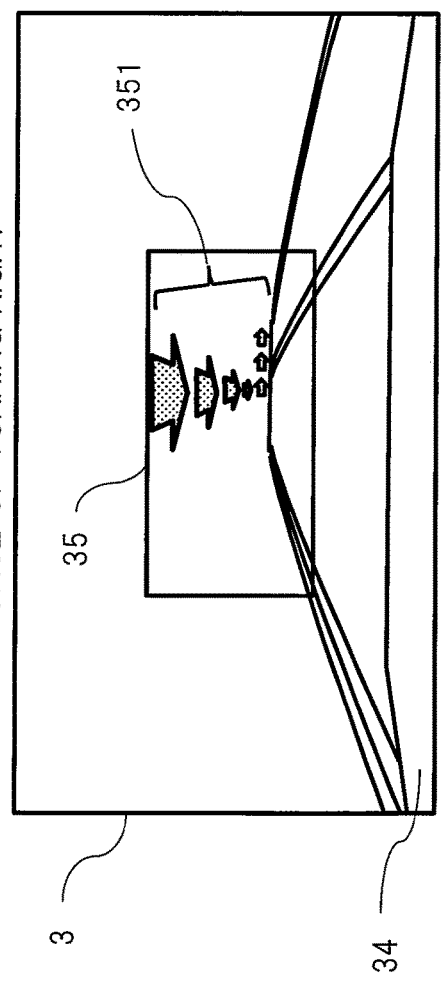
(b) CASE OF TURNING RIGHT FIG. 27
COUNTERMEASURE AROUND TOP OF ASCENDING SLOPE (2)
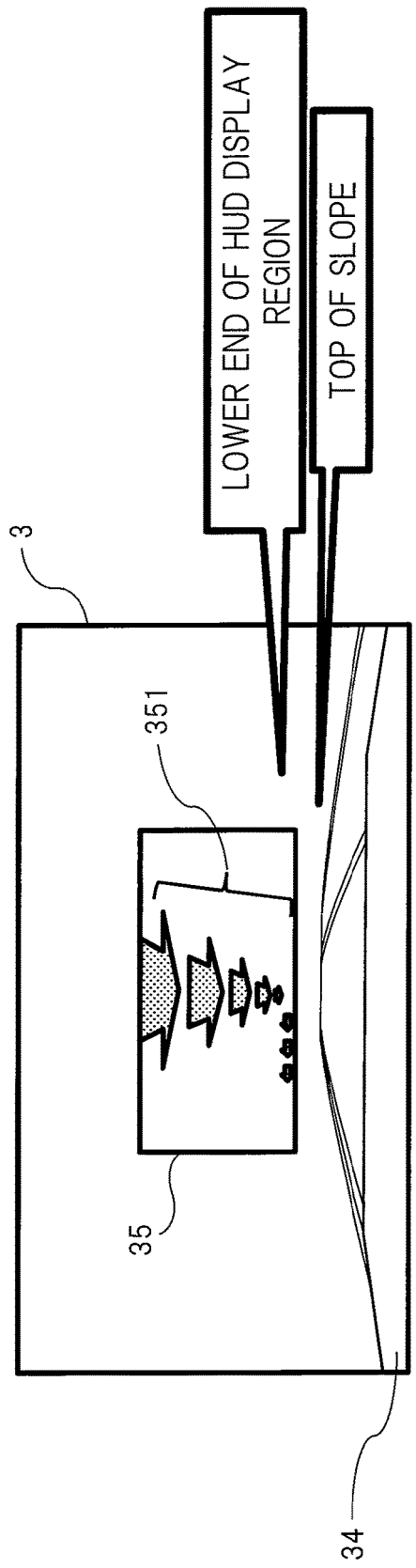
(a) CASE OF TURNING LEFT
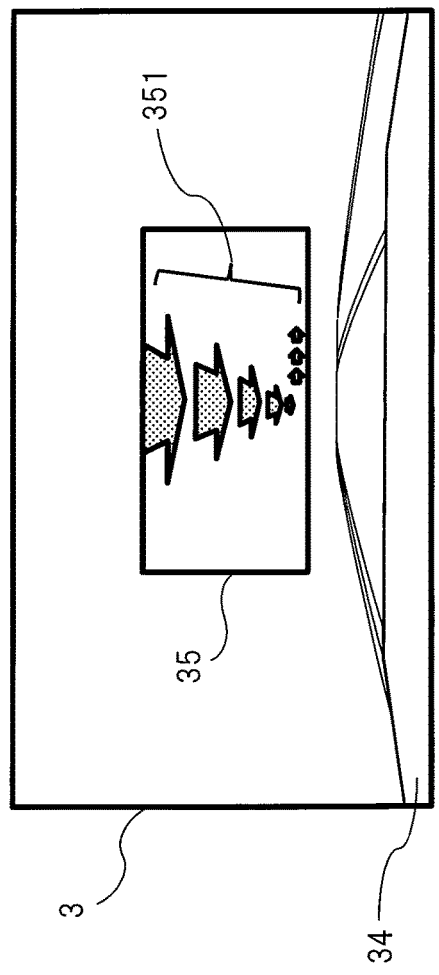
(b) CASE OF TURNING RIGHT FIG. 28
COUNTERMEASURE AROUND END OF DESCENDING SLOPE (1)
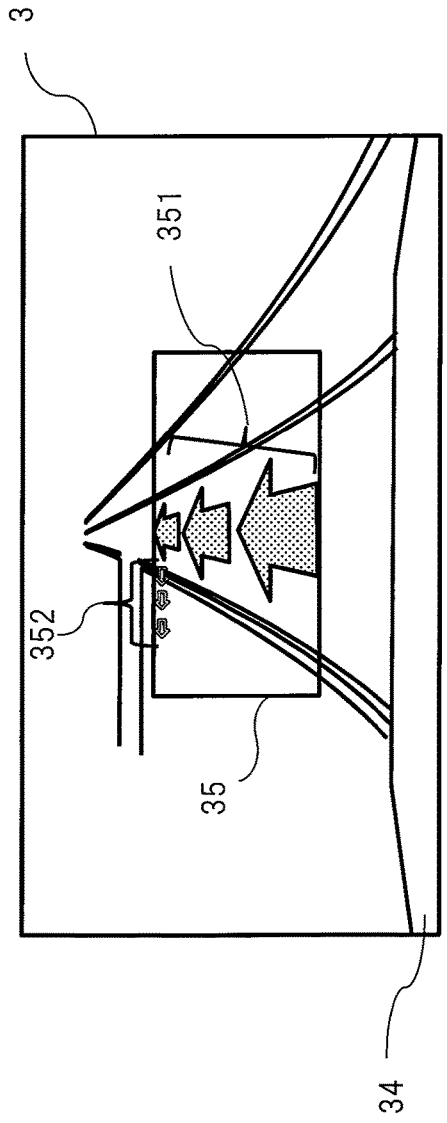
(a)
CASE OF TURNING LEFT
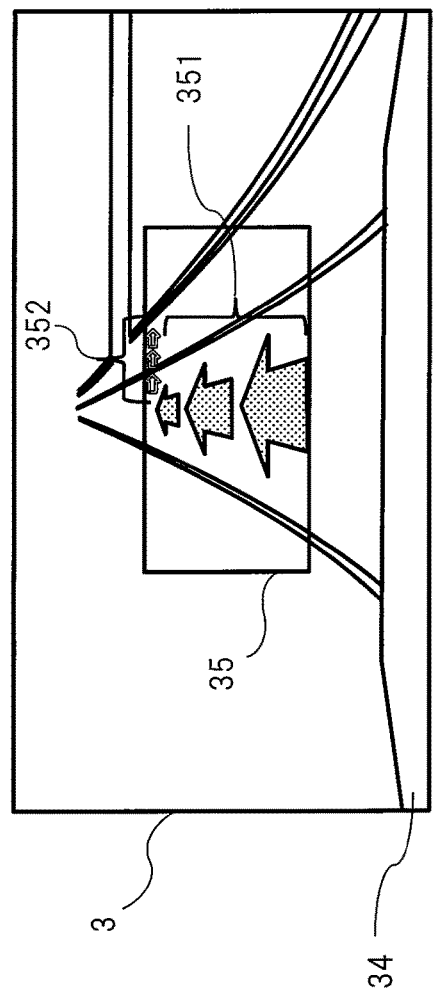
(b)
CASE OF TURNING RIGHT FIG. 31
COUNTERMEASURE AROUND END OF DESCENDING SLOPE AND COUNTERMEASURE FOR CURVE
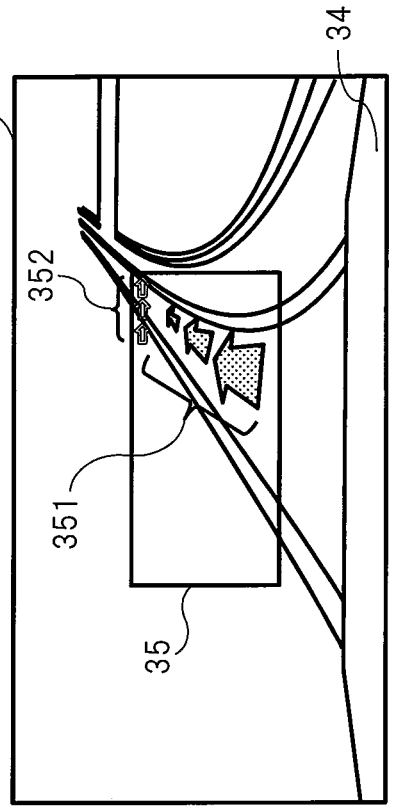
(a) CASE OF TURNING LEFT AT RIGHT CURVE
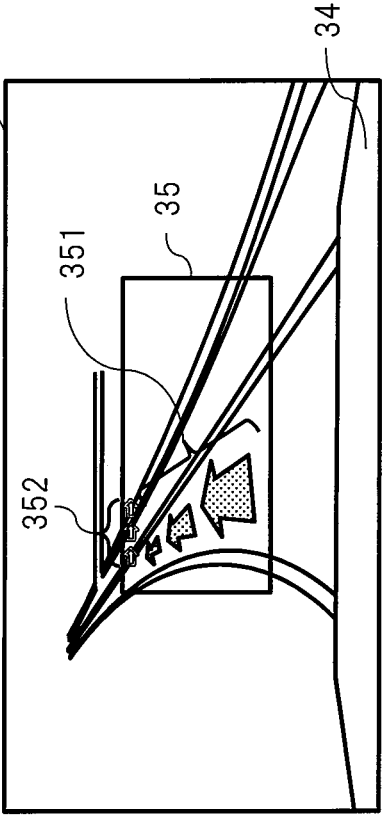
(b) CASE OF TURNING RIGHT AT RIGHT CURVE
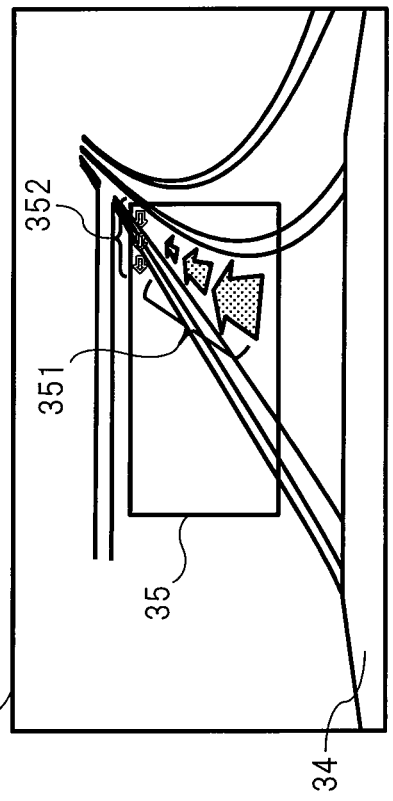
(c) CASE OF TURNING LEFT AT LEFT CURVE
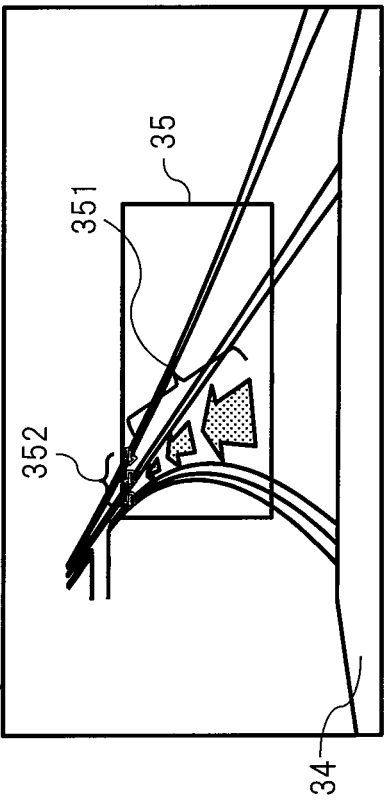
(d) CASE OF TURNING RIGHT AT LEFT CURVE

HEAD-UP DISPLAY APPARATUS

TECHNICAL FIELD

The present invention relates to a head-up display apparatus, and more particularly, to a technique that can be effectively applied to a head-up display apparatus using augmented reality (AR).

BACKGROUND ART

For example, for a vehicle such as an automobile, information such as a vehicle speed and a rotational speed of an engine is typically displayed on an instrument panel in a dashboard. Also, a screen of a car navigation system or the like is incorporated in the dashboard or displayed on a display set up on the dashboard. When a driver visually recognizes these pieces of information, it is required to move a line of sight largely, and thus, as a technique of reducing a movement amount of the line of sight, a head-up display (Head Up Display, hereinafter referred to as "HUD," in some cases) which projects information such as a vehicle speed and information such as an instruction relating to a car navigation system onto a front glass (windshield) to display has been known.

In an in-vehicle display apparatus also including the HUD, since a vehicle may vibrate or incline in accordance with a running condition, a case in which visibility of a display video image may cause a problem or a case in which suitable contents cannot be displayed may be generated, in some cases.

As a technique related to improvement in visibility of a display video image in the HUD, for example, Japanese Patent Application Laid-Open Publication No. 2013-237320 (Patent Document 1) discloses that a rotational component generated in a vehicle body is acquired as an inclination of the vehicle body, a video image is rotationally corrected three-dimensionally based on this inclination, and a position and an inclination for displaying the rotationally corrected video image are decided to project and display the video image.

Also, Japanese Patent Application Laid-Open Publication No. 2007-55365 (Patent Document 2) discloses that, when a distance scale is displayed in an HUD, by acquiring information of a running point at which an own vehicle is currently running, and information of a scheduled running point at which the own vehicle will run from a map data of a navigation device, an incline angle of a road on which the own vehicle runs is acquired based on these pieces of information, and a display height of the distance scale from a ground is corrected by using a correction coefficient in accordance with the incline angle and displayed.

Also, Japanese Patent Application Laid-Open Publication No. 2006-7867 (Patent Document 3) discloses that, in accordance with a detected running condition such as a right or left turn and accelerated or decelerated speed, control is performed such that a display position of a generated video image is, for example, shifted in the left direction when the left turn is detected and shifted in the right direction when the right turn is detected.

Also, Japanese Patent Application Laid-Open Publication No. 2015-202842 (Patent Document 4) discloses that a display position of video image information is moved in a direction in which a field of view of a driver is ensured according to a vehicle state.

RELATED ART DOCUMENTS

Patent Documents

Patent Document 1: Japanese Patent Application Laid-Open Publication No. 2013-237320
Patent Document 2: Japanese Patent Application Laid-Open Publication No. 2007-55365
Patent Document 3: Japanese Patent Application Laid-Open Publication No. 2006-7867
Patent Document 4: Japanese Patent Application Laid-Open Publication No. 2015-202842

SUMMARY OF THE INVENTION

Problems to be Solved by the Invention

The HUD projects a video image onto a windshield, allowing a driver to recognize the video image as a virtual image outside a vehicle. In contrast, an HUD (hereinafter referred to as an "AR-HUD," in some cases) achieving a so-called AR function capable of showing information related to an object etc. to the driver by displaying such that a virtual image is overlapped with actual scenery outside the vehicle seen through the windshield, has been known. Even in such AR-HUD, it is required to perform adjustment for maintaining visibility, suitability, and the like of a display video image, in accordance with a running condition and the like of the vehicle.

In this regard, for example, using the techniques disclosed in Patent Documents 1 to 3 above enables reduction and elimination of adverse influence on visibility and suitability of the display video image (virtual image) even in a case in which the vehicle vibrates or inclines in accordance with a running condition.

Meanwhile, these techniques perform adjustment of a display position, display contents, and the like of a video image to be displayed in a display region of the virtual image in the HUD as an object, in accordance with a running condition. However, in the case of the HUD, taking into consideration such a configuration that an effect of reducing a movement amount of a line of sight of a driver can be obtained regardless of a running condition of a vehicle, it is desirable to perform not only adjustment of the video image in the display region, but also adjustment of moving a position of the display region itself, for example.

In this regard, in the technique disclosed in Patent Document 4, it is possible to move the display region itself in the HUD in accordance with the vehicle state. However, the technique disclosed in Patent Document 4 is intended to ensure the field of view of the driver even when the vehicle state has changed and is to move the display region in the HUD to a position at which the display region does not become hindrance to the driver. Applying such technique to the AR-HUD causes a case in which a virtual image cannot be overlapped with actual scenery included in the field of view of the driver, whereby the AR function fails to have workability.

In view of this, an object of the present invention is to provide a head-up display apparatus capable of displaying a virtual image so as to be suitably overlapped with actual scenery in accordance with a running condition of a vehicle.

The above and other objects and novel features of the present invention will be apparent from the description of the present specification and the accompanying drawings.

Means to Solving the Problems

The typical ones of the inventions disclosed in the present application will be briefly described as follows.

A head-up display apparatus according to a typical embodiment of the present invention which displays a virtual image to be overlapped with scenery in front of a vehicle with respect to a driver by projecting a video image onto a windshield of the vehicle, the head-up display apparatus includes:

- a vehicle information acquisition unit configured to acquire various kinds of vehicle information which can be detected by the vehicle;
- a controller configured to control display of the video image based on the vehicle information acquired by the vehicle information acquisition unit;
- a video image display configured to form the video image based on an instruction from the controller;
- a mirror configured to reflect the video image formed by the video image display to project onto the windshield;
- a mirror driver configured to change an angle of the mirror based on an instruction from the controller; and
- a display distance adjusting mechanism configured to adjust a display distance of the virtual image with respect to the driver.

Then, the controller adjusts the angle of the mirror via the mirror driver based on the vehicle information such that the virtual image can be displayed with respect to the driver to be overlapped with the scenery.

Effects of the Invention

Effects obtained by the typical ones of the inventions disclosed in the present application will be briefly described as follows.

Specifically, according to the typical embodiment of the present invention, it is possible to display a virtual image to be suitably overlapped with actual scenery in accordance with a running condition of a vehicle in an AR-HUD.

BRIEF DESCRIPTIONS OF THE DRAWINGS

Figure 13:
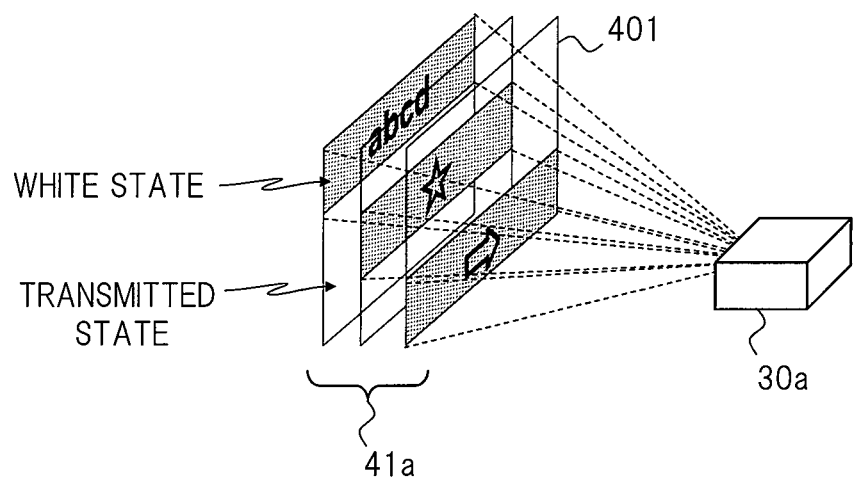
Figure 14:
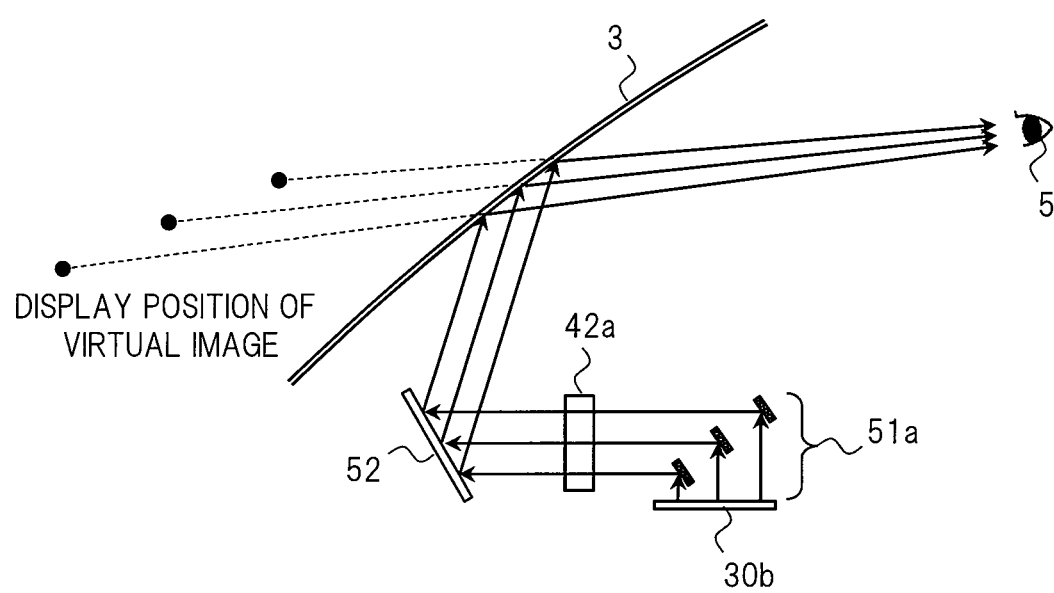
Figure 15:
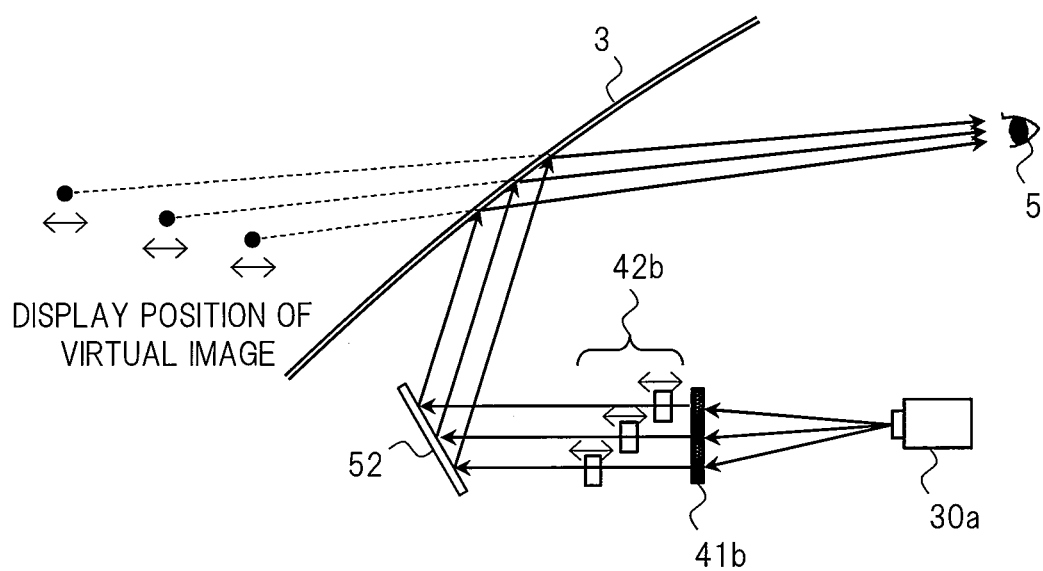
Figure 17:
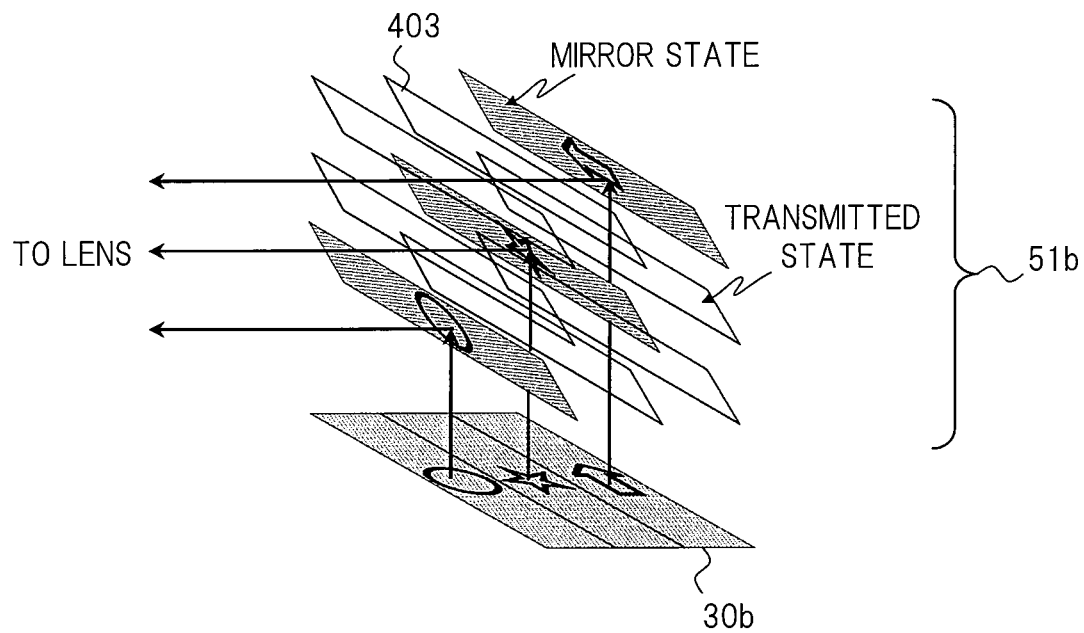
Figure 18:
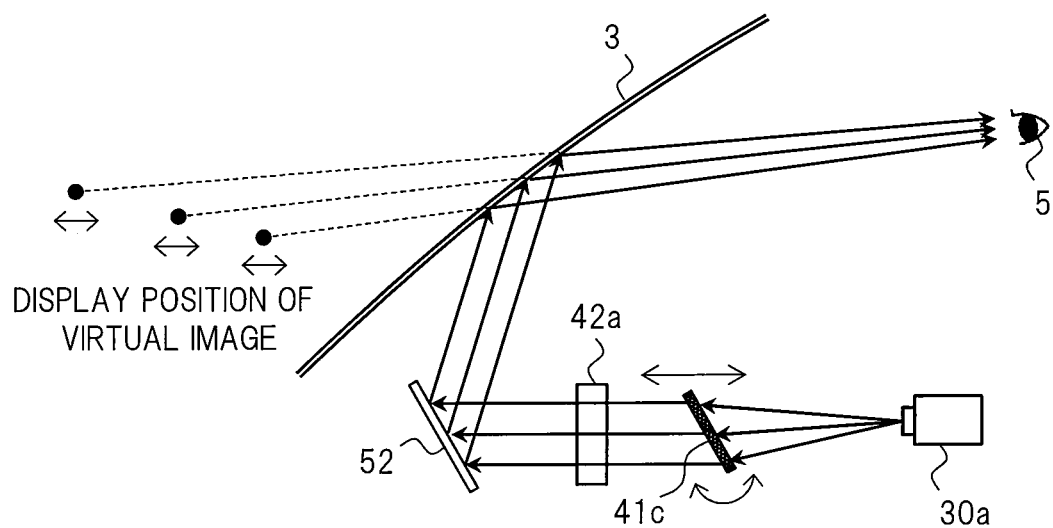
Figure 20:
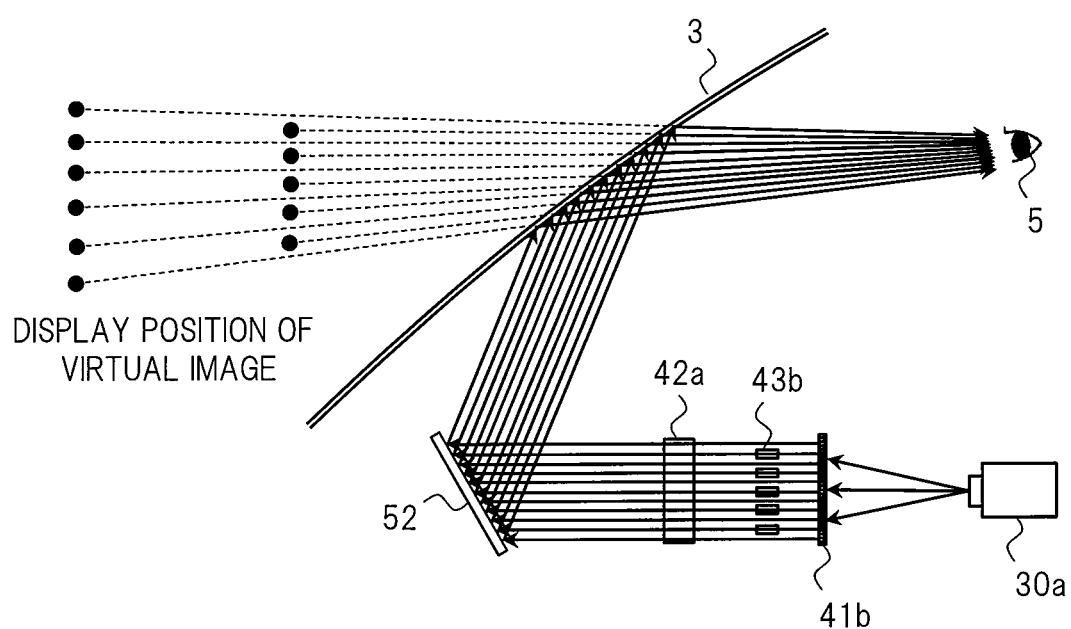
Figure 21:
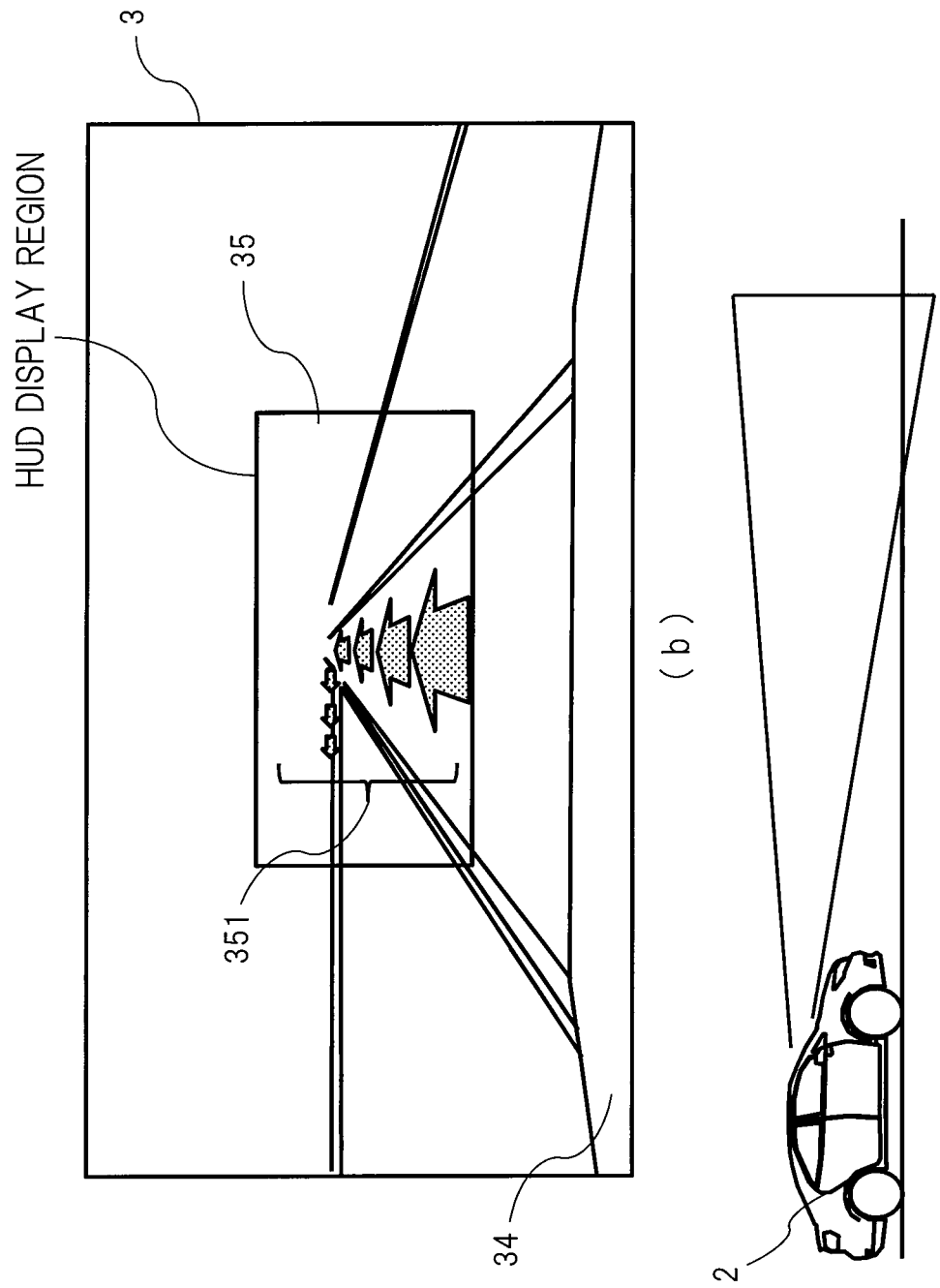
Figure 24:
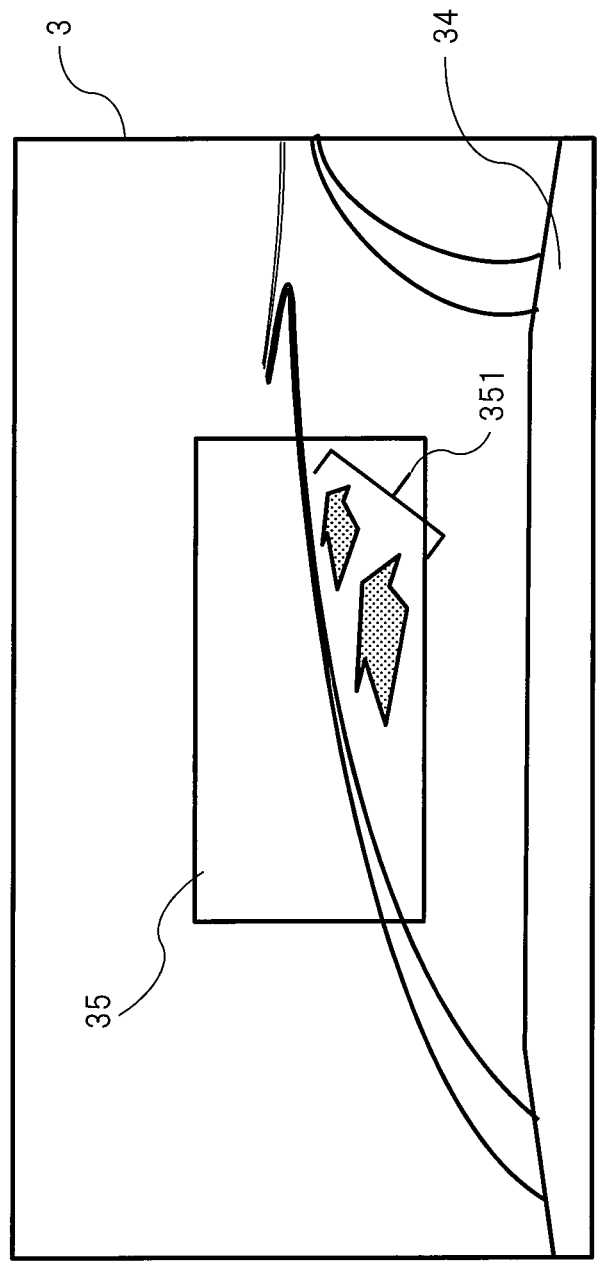
Figure 25:
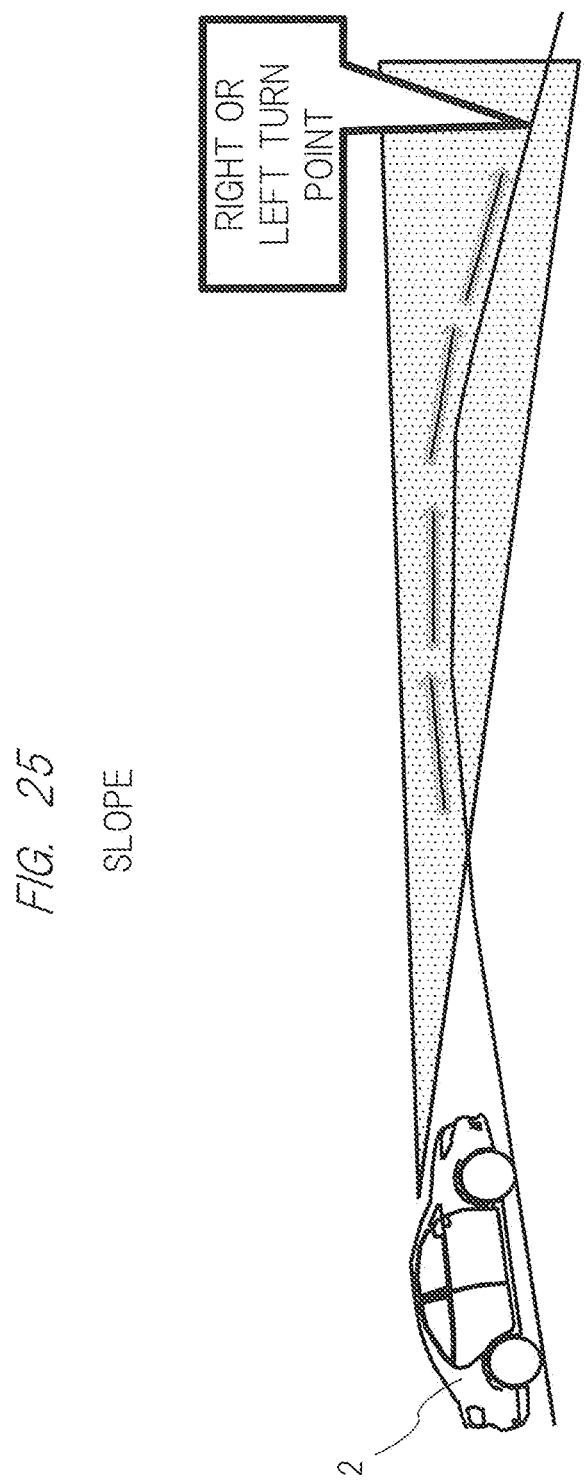
Figure 32:
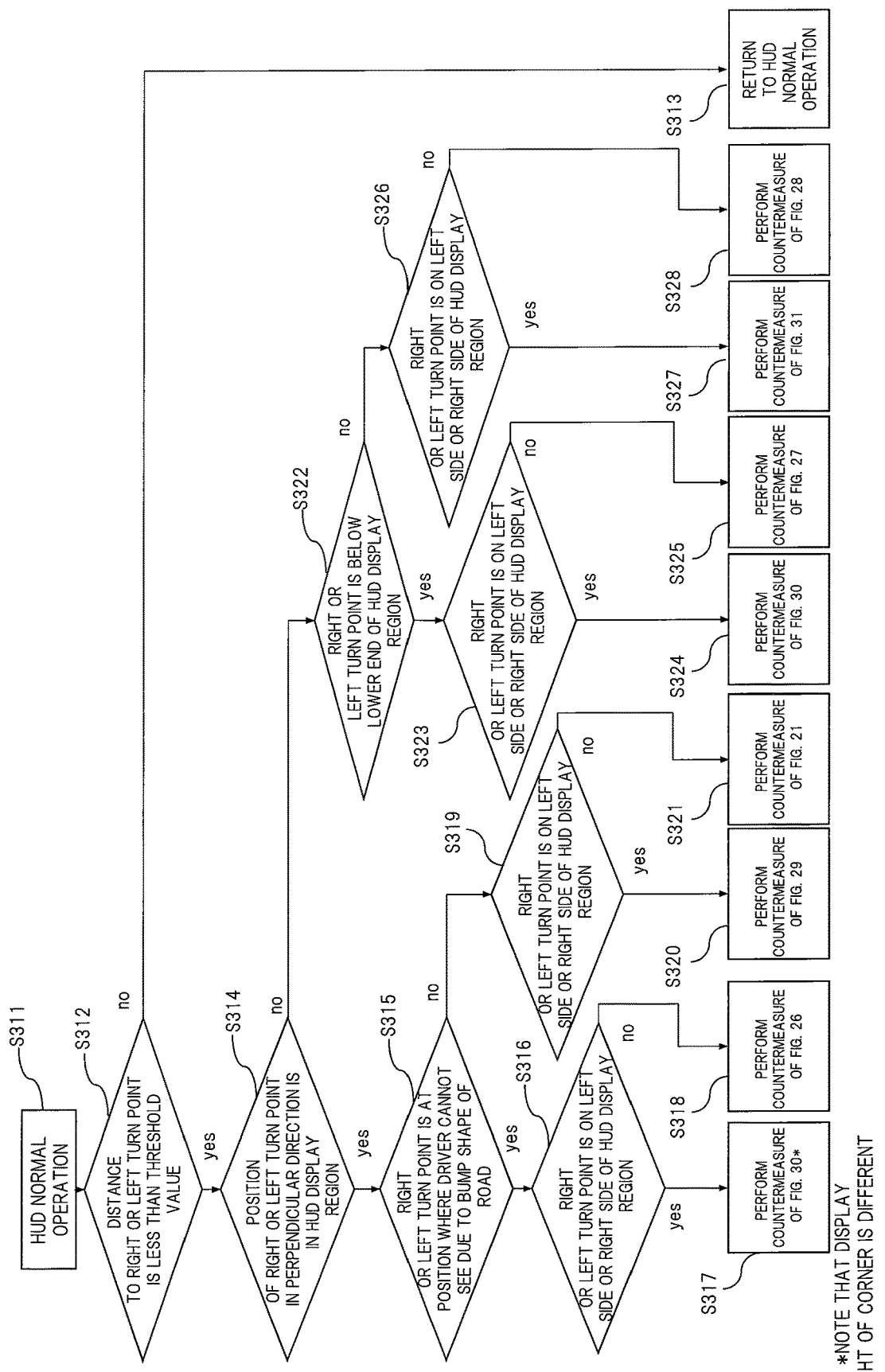
Figure 33:
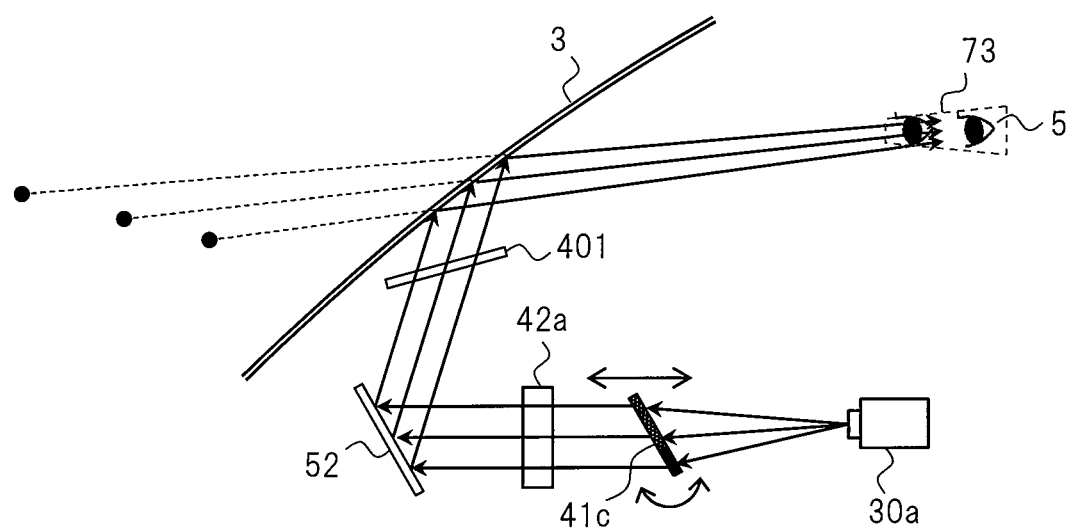
Figure 35:
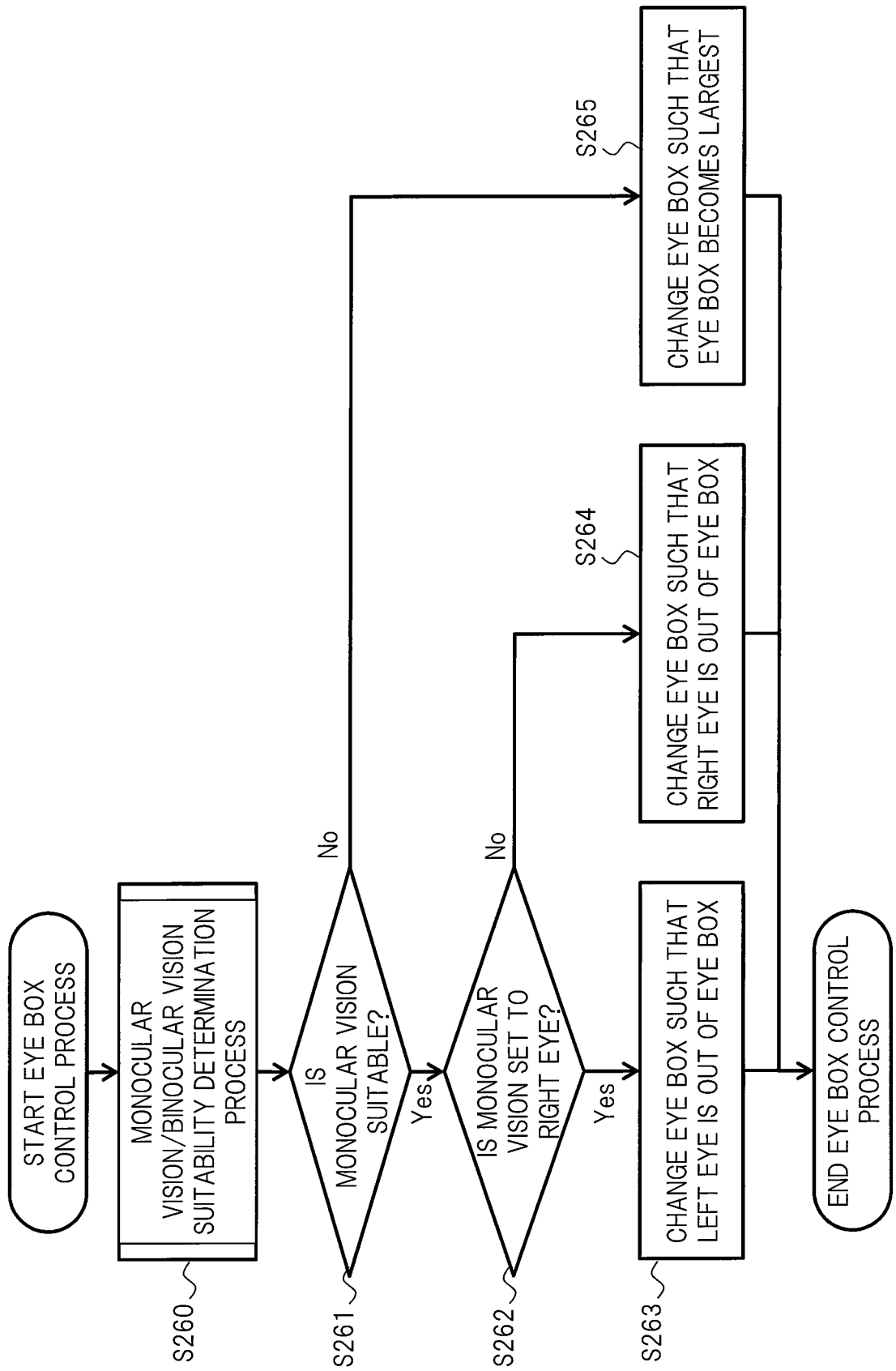

FIGS. 12(a) and 12(b) are views illustrating an outline of an example of display distance adjustment using a functional liquid crystal film according to the one embodiment of the present invention;

FIG. 13 is a view illustrating an outline of a configuration example of a diffuser constituted by the functional liquid crystal films according to the one embodiment of the present invention;

FIG. 14 is a view illustrating an outline of an example of display distance adjustment using a plurality of mirrors according to the one embodiment of the present invention;

FIG. 15 is a view illustrating an outline of an example of display distance adjustment using a movable lens according to the one embodiment of the present invention;

FIGS. 16(a) and 16(b) are views illustrating an outline of an example of display distance adjustment using a light control mirror according to the one embodiment of the present invention;

FIG. 17 is a view illustrating an outline of a configuration example of the light control mirror according to the one embodiment of the present invention;

FIG. 18 is a view illustrating an outline of an example of display distance adjustment using a movable diffuser according to the one embodiment of the present invention;

FIGS. 19(a) and 19(b) are views illustrating an outline of an example of display distance adjustment using a movable optical filter according to the one embodiment of the present invention;

FIG. 20 is a view illustrating an outline of an example of display distance adjustment using a comb-like optical filter according to the one embodiment of the present invention;

FIGS. 21(a) and 21(b) are views illustrating one example of a mode of navigation display according to another embodiment of the present invention;

FIGS. 22(a) and 22(b) are views illustrating one example of the mode of the navigation display according to the another embodiment of the present invention;

FIGS. 23(a) and 23(b) are views illustrating one example of the mode of the navigation display according to the another embodiment of the present invention;

FIG. 24 is a view illustrating one example of the mode of the navigation display according to the another embodiment of the present invention;

FIG. 25 is a view illustrating one example of the mode of the navigation display according to the another embodiment of the present invention;

FIGS. 26(a) and 26(b) are views illustrating one example of the mode of the navigation display according to the another embodiment of the present invention;

FIGS. 27(a) and 27(b) are views illustrating one example of the mode of the navigation display according to the another embodiment of the present invention;

FIGS. 28(a) and 28(b) are views illustrating one example of the mode of the navigation display according to the another embodiment of the present invention;

FIGS. 29(a), 29(b), 29(c), and 29(d) are views illustrating one example of the mode of the navigation display according to the another embodiment of the present invention;

FIGS. 30(a), 30(b), 30(c), and 30(d) are views illustrating one example of the mode of the navigation display according to the another embodiment of the present invention;

FIGS. 31(a), 31(b), 31(c), and 31(d) are views illustrating one example of the mode of the navigation display according to the another embodiment of the present invention;

FIG. 32 is a flow chart illustrating one example of a process for performing the modes of the navigation display described above;

FIG. 33 is a view illustrating an outline of a configuration example of achieving monocular vision/binocular vision control of navigation information display according to still another embodiment of the present invention;

FIGS. 34(a), 34(b), and 34(c) are views for explaining an operation of an eye box achieving the monocular vision/binocular vision control of the navigation information display described above;

FIG. 35 is a flow chart illustrating one example of a process for achieving the monocular vision/binocular vision control of the navigation information display described above; and FIG. 36 is a flow chart illustrating detailed contents of a monocular vision/binocular vision control suitability determination process (S260) in the flow chart illustrated in FIG. 35 above.

DETAILED DESCRIPTION OF PREFERRED EMBODIMENTS

Hereinafter, embodiments of the present invention will be described in detail in accordance with the drawings. Note that the same components are denoted by the same reference characters throughout the drawings for describing the embodiments in principle, and the repetitive description thereof is omitted. Meanwhile, illustration of a portion which has been denoted by a reference character and described in a figure is not repeated in describing another figure, but the portion may be referred to by denoting the same reference character.

<Apparatus Configuration>

Figure 2:
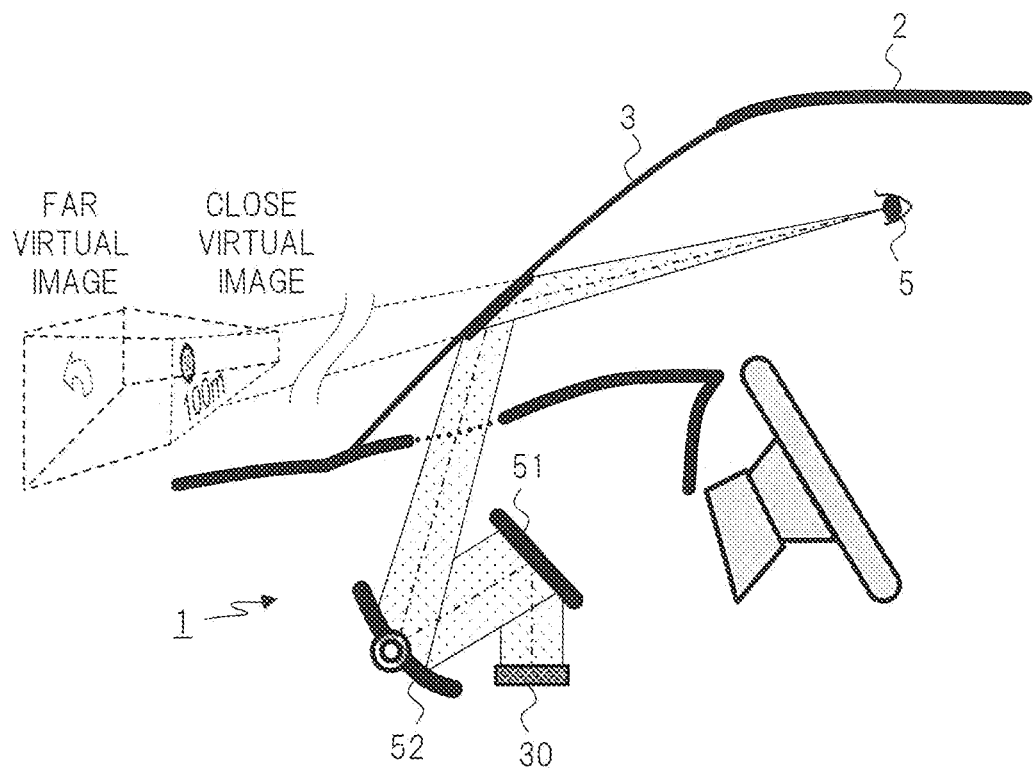
FIG. 2 is a view illustrating an outline of an example of an operation concept of the head-up display apparatus according to the one embodiment of the present invention.

FIG. 2 is a view illustrating an outline of an example of an operation concept of a head-up display apparatus according to one embodiment of the present invention. In an AR-HUD 1 of the present embodiment, a video image displayed on a video image display 30 constituted by a projector, an LCD (liquid Crystal Display), and the like is reflected by a mirror 51 and a mirror 52 (for example, a free-form surface mirror, a mirror having an asymmetric shape with respect to an optical axis, or the like) and projected onto a windshield 3 of a vehicle 2.

A driver 5 sees the video image projected onto the windshield 3 and then, visually recognizes the above video image as a virtual image through the transparent windshield 3 in front thereof. In the present embodiment, as described later, by adjusting an angle of the mirror 52, a position where the video image is projected onto the windshield 3 is adjusted, so that it is possible to adjust a display position of the virtual image which the driver 5 sees, in an upward and downward direction. Also, by using various kinds of methods described later, it is also possible to adjust a display distance, for example, displaying the virtual image near (for example, 2 to 3 m ahead) or displaying the virtual image far (for example, 30 to 40 m ahead). Then, adjusting the display position and the display distance of the virtual image such that the virtual image is overlapped with scenery outside the vehicle (a road, a building, a person, etc.) achieves an AR function.

Figure 1:
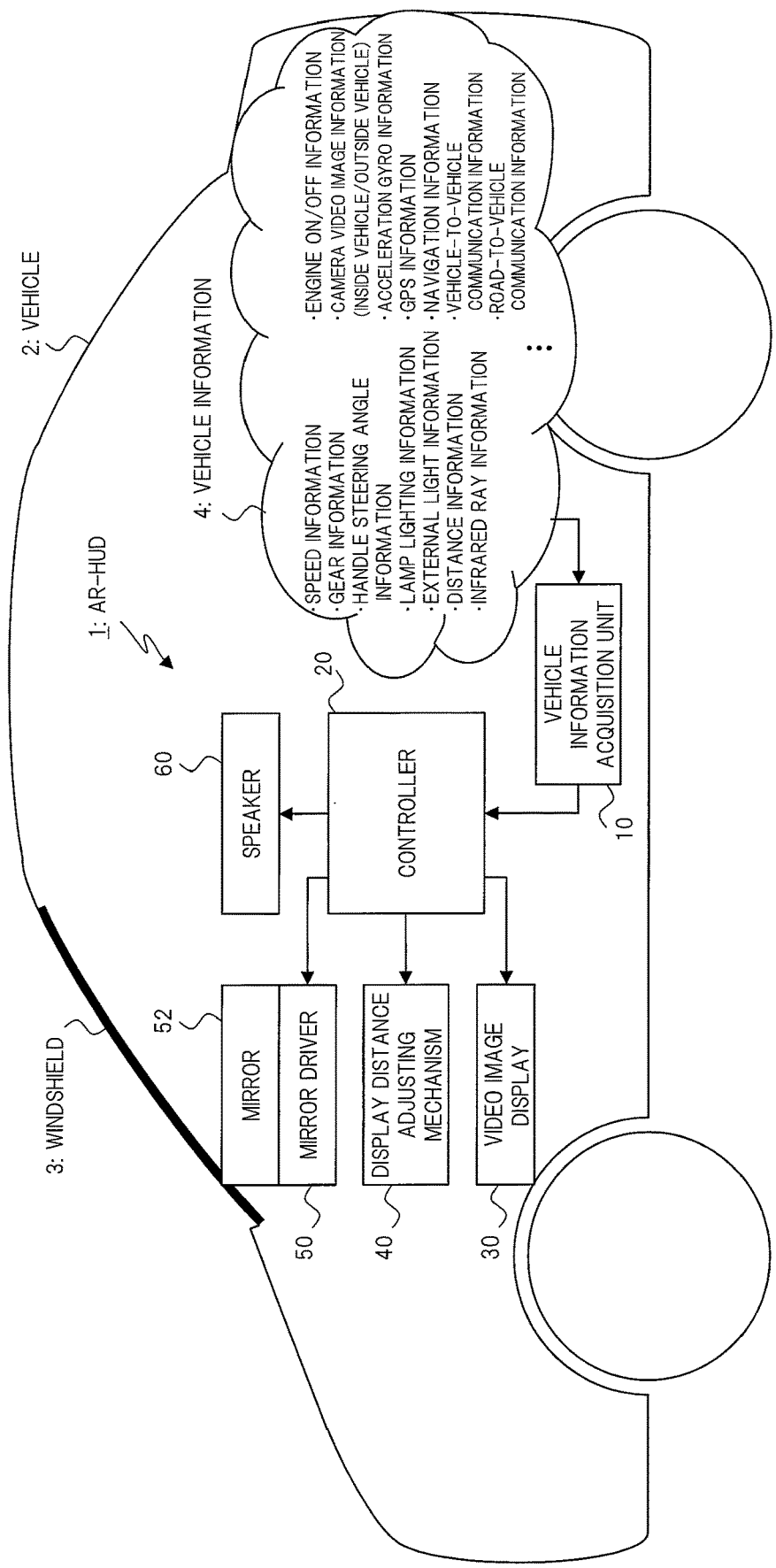
FIG. 1 is a functional block diagram illustrating an outline of an overall configuration example of a head-up display apparatus according to one embodiment of the present invention.

FIG. 1 is a functional block diagram illustrating an outline of an overall configuration example of the head-up display apparatus according to the one embodiment of the present invention. The AR-HUD 1 mounted in the vehicle 2 includes, for example, a vehicle information acquisition unit 10, a controller 20, the video image display 30, a display distance adjusting mechanism 40, a mirror driver 50, the mirror 52, and a speaker 60. Note that, although a shape of the vehicle 2 is displayed like a passenger car in the example of FIG. 1, it is not limited to this and can be appropriately applied to all kinds of general vehicles.

The vehicle information acquisition unit 10 includes information acquisition devices such as various types of sensors set up in respective units of the vehicle 2 to be described later, and the vehicle information acquisition unit 10 detects various events generated in the vehicle 2 and detects and acquires values of various parameters relating to a running condition at a predetermined interval, thereby acquiring vehicle information 4 to output. The vehicle information 4 can include, as illustrated, speed information and gear information of the vehicle 2, handle steering angle information, lamp lighting information, external light information, distance information, infrared ray information, engine ON/OFF information, camera video image information (inside a vehicle/outside a vehicle), acceleration gyro information, GPS (Global Positioning System) information, navigation information, vehicle-to-vehicle communication information, road-to-vehicle communication information, and the like, for example.

The controller 20 has a function of controlling an operation of the AR-HUD 1 and for example, is mounted with a CPU (Central Processing Unit) and software executed thereby. The controller 20 may be mounted with hardware such as a microcomputer or an FPGA (Field Programmable Gate Array). As illustrated also in FIG. 2, the controller 20 drives the video image display 30 to form a video image to be displayed as a virtual image based on the vehicle information 4 and the like acquired from the vehicle information acquisition unit 10 and has the video image reflected appropriately by the mirror 52 or the like, thereby projecting the video image onto the windshield 3. Then, by a method described later, control such as adjusting the display position of a display region of the virtual image or adjusting the display distance of the virtual image is performed.

As described above, the video image display 30 is a device constituted by the projector and the LCD, for example, and forms a video image for displaying a virtual image based on an instruction from the controller 20 to project and display the video image. The display distance adjusting mechanism 40 is a mechanism for adjusting a distance of a virtual image to be displayed from the driver 5 based on an instruction from the controller 20, and for example, is mounted with any one or more of various kinds of display distance adjusting methods described later.

The mirror driver 50 adjusts an angle of the mirror 52 based on an instruction from the controller 20 and adjusts a position of the display region of the virtual image in the upward and downward direction. Adjusting the position of the display region of the virtual image will be described later. The speaker 60 performs audio output relating to the AR-HUD 1. For example, it is possible to perform voice guidance of the navigation system, audio output in notifying the driver 5 of a warning etc. by the AR function, and the like.

Figure 3:
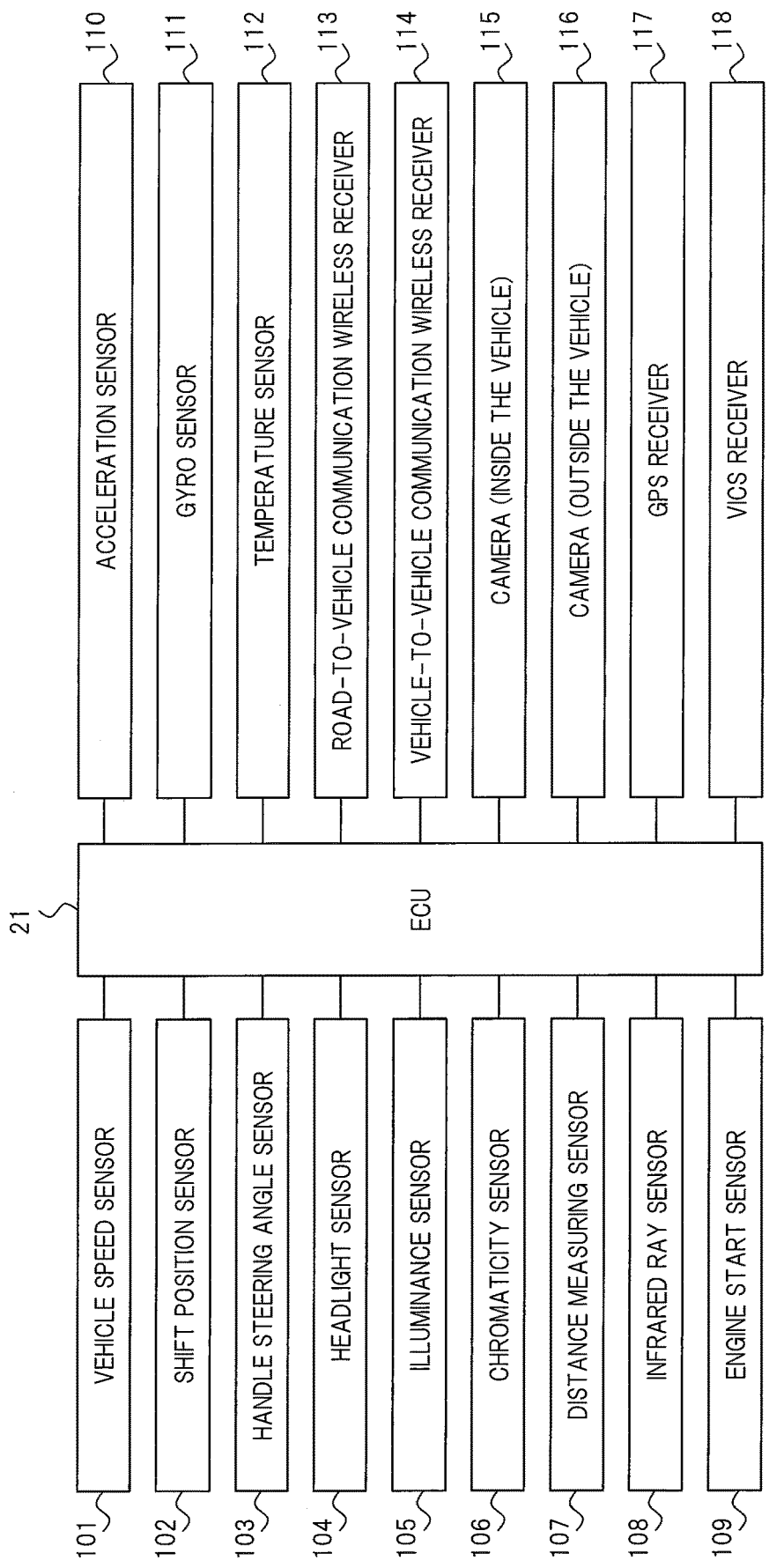
FIG. 3 is a view illustrating an outline of an example of a hardware configuration relating to acquisition of vehicle information according to the one embodiment of the present invention.

FIG. 3 is a view illustrating an outline of an example of a hardware configuration relating to acquisition of the vehicle information 4 in the head-up display apparatus according to the present embodiment. Herein, part of the hardware configuration of the vehicle information acquisition unit 10 and the controller 20 are mainly indicated. Acquisition of the vehicle information 4 is, for example, performed by the information acquisition devices such as various types of sensors connected to an ECU (Electronic Control Unit) 21 under control of the ECU 21.

These information acquisition devices include, for example, a vehicle speed sensor 101, a shift position sensor 102, a handle steering angle sensor 103, a headlight sensor 104, an illuminance sensor 105, a chromaticity sensor 106, a distance measuring sensor 107, an infrared ray sensor 108, an engine start sensor 109, an acceleration sensor 110, a gyro sensor 111, a temperature sensor 112, a road-to-vehicle communication wireless receiver 113, a vehicle-to-vehicle communication wireless receiver 114, a camera (inside the vehicle) 115, a camera (outside the vehicle) 116, a GPS receiver 117, a VICS (Vehicle Information and Communication System, registered trademark (the same applies hereinafter)) receiver 118, and the like. It is not always necessary to include all the devices, and other kinds of devices may be included. It is possible to appropriately use the vehicle information 4 which can be acquired by a device included.

The vehicle speed sensor 101 acquires the speed information of the vehicle 2. The shift position sensor 102 acquires the current gear information of the vehicle 2. The handle steering angle sensor 103 acquires the handle steering angle information. The headlight sensor 104 acquires the lamp lighting information relating to ON/OFF of the headlight. The illuminance sensor 105 and the chromaticity sensor 106 acquire the external light information. The distance measuring sensor 107 acquires the distance information between the vehicle 2 and an external object. The infrared ray sensor 108 acquires the infrared ray information relating to presence/absence of an object at a close distance of the vehicle 2, a distance, and the like. The engine start sensor 109 detects the engine ON/OFF information.

The acceleration sensor 110 and the gyro sensor 111 acquire the acceleration gyro information including acceleration and angle speed as information of posture and behavior of the vehicle 2. The temperature sensor 112 acquires the temperature information inside and outside the vehicle. The road-to-vehicle communication wireless receiver 113 and the vehicle-to-vehicle communication wireless receiver 114 acquire the road-to-vehicle communication information received by road-to-vehicle communication between the vehicle 2 and a road, a road sign, a traffic light, etc., and the vehicle-to-vehicle communication information received by vehicle-to-vehicle communication between the vehicle 2 and other vehicles around the vehicle 2, respectively.

The camera (inside the vehicle) 115 and the camera (outside the vehicle) 116 shoot moving images of conditions inside the vehicle and outside vehicle to acquire the camera video image information (inside the vehicle/outside the vehicle), respectively. The camera (inside the vehicle) 115 shoots a posture, a position of the eye, and motion of the driver 5, for example. By analyzing obtained moving images, it is possible to grasp a fatigue condition and a position of the line of sight of the driver 5, for example. Also, the camera (outside the vehicle) 116 shoots a surrounding condition such as the front and the back of the vehicle 2. By analyzing obtained moving images, it is possible to grasp presence/absence of a moving object such as other vehicle and a person around the vehicle 2, a building and geography, a road surface condition (rain, fallen snow, frozen, bump, etc.), and the like, for example.

The GPS receiver 117 and the VICS receiver 118 acquire the GPS information obtained by receiving a GPS signal and the VICS information obtained by receiving a VICS signal, respectively. These receivers maybe mounted as apart of the car navigation system acquiring these pieces of information to use.

Figure 4:
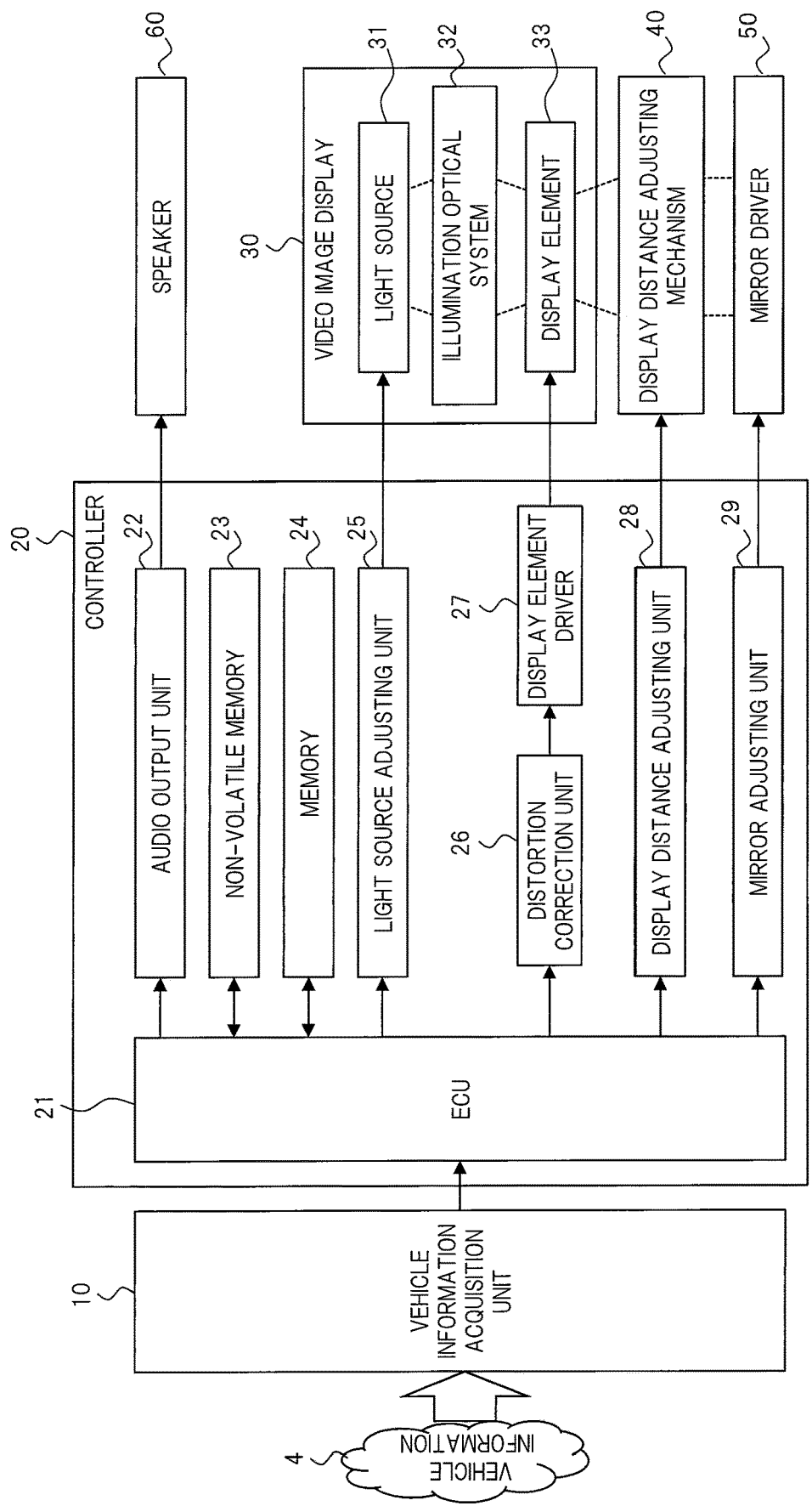
FIG. 4 is a functional block diagram illustrating details of a configuration example of the head-up display apparatus according to the one embodiment of the present invention.

FIG. 4 is a functional block diagram illustrating details of a configuration example of the head-up display apparatus according to the present embodiment. The example of FIG. 4 illustrates a case in which the video image display 30 is a projector, and the video image display 30 includes a light source 31, an illumination optical system 32, and a display element 33, for example. The light source 31 is a component generating an illumination light for projection, and for example, a high pressure mercury lamp, a xenon lamp, an LED (Light Emitting Diode) light source, a laser light source, or the like can be used. The illumination optical system 32 is an optical system collecting the illumination light generated in the light source 31 and further homogenizing the illumination light to irradiate the display element 33. The display element 33 is an element generating a video image to be projected, and for example, a transmission liquid crystal panel, a reflective liquid crystal panel, a DMD (Digital Micromirror Device) (registered trademark) panel, or the like can be used.

More specifically, the controller 20 includes an ECU 21, an audio output unit 22, a non-volatile memory 23, a memory 24, a light source adjusting unit 25, a distortion correction unit 26, a display element driver 27, a display distance adjusting unit 28, a mirror adjusting unit 29, and the like. As illustrated in FIG. 3, the ECU 21 acquires the vehicle information 4 via the vehicle information acquisition unit 10, records and stores the acquired information in the non-volatile memory 23 or the memory 24, and reads out the acquired information therefrom, as needed. The non-volatile memory 23 may have setting information such as setting values and parameters for various controls stored therein. Also, the ECU 21 generates a video image data relating to a virtual image to be displayed as the AR-HUD 1 by executing a dedicated program, or the like.

The audio output unit 22 outputs audio information via the speaker 60 as needed. The light source adjusting unit 25 adjusts a light emitting amount of the light source 31 of the video image display 30. When there are a plurality of light sources 31, it may be configured so as to control the plurality of light sources 31 individually. When the video image display 30 projects a video image generated by the ECU 21 onto the windshield 3 of the vehicle 2, the distortion correction unit 26 corrects a distortion of the video image generated due to a curvature of the windshield 3 by image processing. The display element driver 27 sends a drive signal in accordance with a video image data corrected by the distortion correction unit 26 to the display element 33, thus generating a video image to be projected.

When the display distance of the virtual image needs to be adjusted, the display distance adjusting unit 28 drives the display distance adjusting mechanism 40 to adjust the display distance of the video image to be projected from the video image display 30. Various methods of adjusting the display distance of the virtual image will be described later. When a position of the display region of the virtual image itself needs to be adjusted, the mirror adjusting unit 29 changes an angle of the mirror 52 via the mirror driver 50 to move the display region of the virtual image up and down. Position adjustment of the display region of the virtual image will be also described later.

Figure 5:
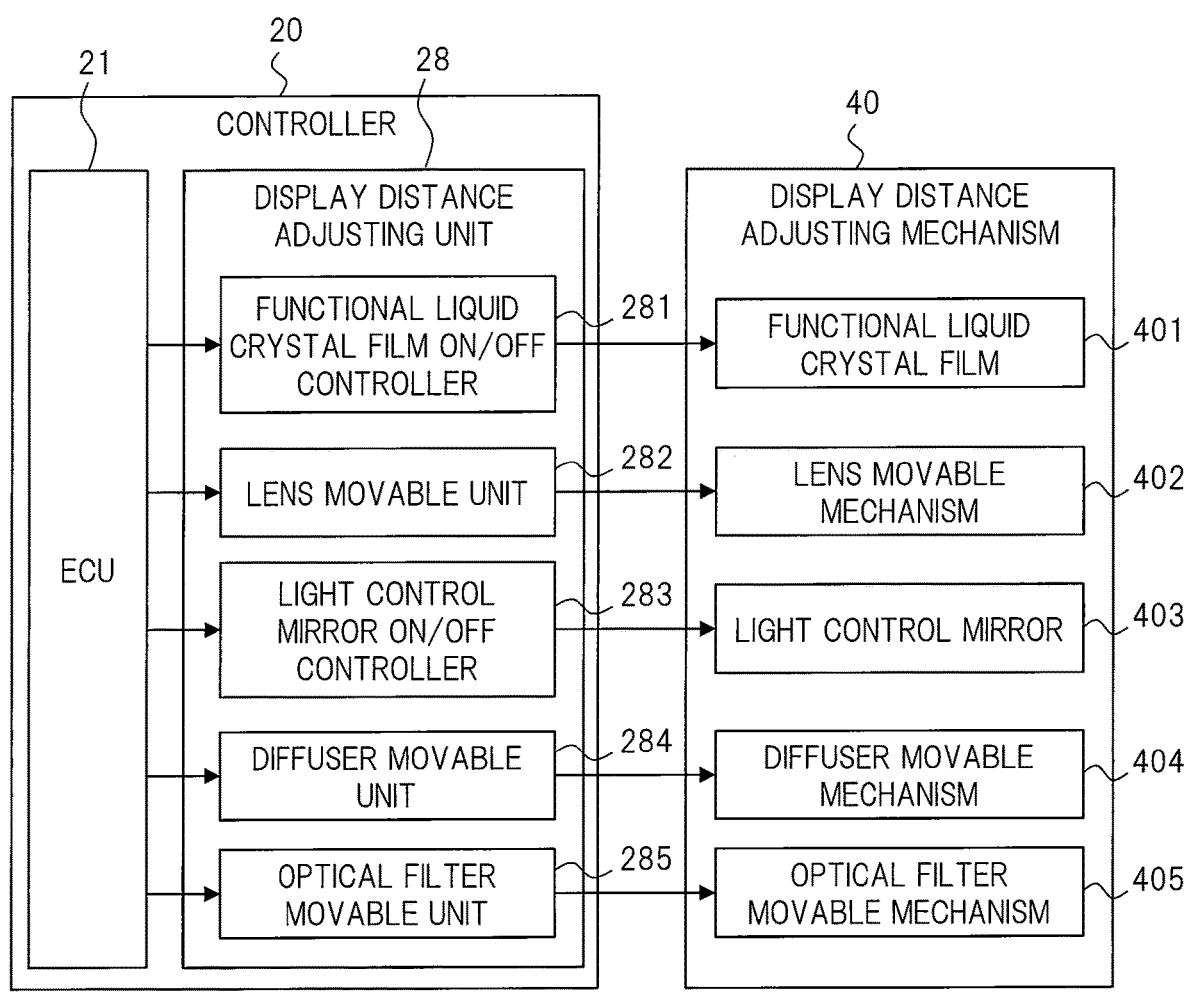
FIG. 5 is a view illustrating details of a configuration example relating to display distance adjustment according to the one embodiment of the present invention.

FIG. 5 is a view illustrating details of a configuration example relating to display distance adjustment in the head-up display apparatus of the present embodiment. The display distance adjusting unit 28 of the controller 20 further includes, as each unit controlled individually by the ECU 21, a functional liquid crystal film ON/OFF controller 281, a lens movable unit 282, alight control mirror ON/OFF controller 283, a diffuser movable unit 284, and an optical filter movable unit 285, for example. Also, as hardware, devices, and the like controlled and driven by these units, the display distance adjusting mechanism 40 further includes a functional liquid crystal film 401, a lens movable mechanism 402, a light control mirror 403, a diffuser movable mechanism 404, an optical filter movable mechanism 405, and the like. Adjusting method of the display distance of the virtual image by each of these units will be described later.

Note that the AR-HUD 1 does not need to include all of these respective units, devices, and the like, and it is sufficient if each unit required for mounting applicable one of the adjusting methods of the display distance of the virtual image described later may be appropriately provided.

<Contents of Processes>

Figure 6:
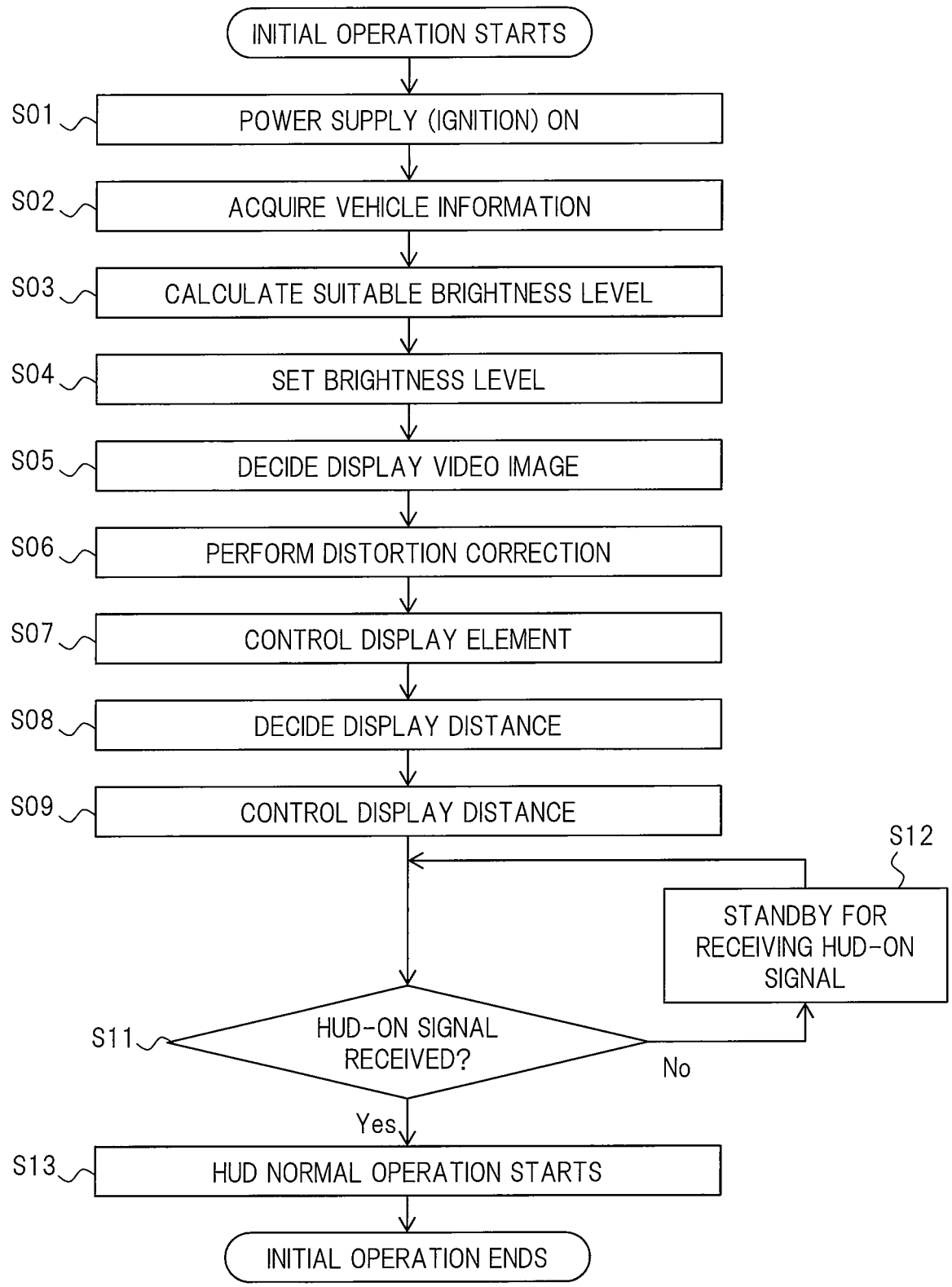
FIG. 6 is a flow chart illustrating an outline of an example of an initial operation according to the one embodiment of the present invention.

FIG. 6 is a flow chart illustrating an outline of an example of an initial operation in the head-up display apparatus of the present embodiment. When an ignition switch is turned ON in the vehicle 2 during stopping and a power supply of the AR-HUD 1 is then turned ON (S01), the AR-HUD 1 first acquires vehicle information by the vehicle information acquisition unit 10 based on an instruction from the controller 20 (S02). Then, the controller 20 calculates a suitable brightness level based on external light information acquired by the illuminance sensor 105, the chromaticity sensor 106, and the like, of the vehicle information 4 (S03) and has the light source adjusting unit 25 control a light emitting amount of the light source 31 to set such that the brightness level becomes the calculated brightness level (S04). For example, when the external light is bright, the brightness level is set to high, and when the external light is dark, the brightness level is set to low.

Subsequently, the ECU 21 decides and generates a video image (an initial image, for example) to be displayed as the virtual image (S05), and after a process of correcting a distortion of the generated video image by the distortion correction unit 26 is performed (S06), the display element driver 27 drives and controls the display element 33 to forma video image to be projected (S07). As a result, the video image is projected onto the windshield 3, so that the driver 5 can visually recognize the virtual image. Subsequently, the ECU 21 or the display distance adjusting unit 28 calculates and decides the display distance of the virtual image (S08), and the display distance adjusting unit 28 drives the display distance adjusting mechanism 40 to control the display distance of the video image projected from the video image display 30 (S09).

When the entire AR-HUD 1 has completed activation and start of each unit also including a series of initial operation described above, an HUD-ON signal is output, and the controller 20 determines whether or not this signal is received (S11). When this signal is not received, the controller 20 continues to standby for receiving the HUD-ON signal for a certain period of time (S12) and repeats a standby process of receiving the HUD-ON signal (S12) until it is determined that the HUD-ON signal is received in the step S11. When it is determined that the HUD-ON signal is received in the step S11, normal operation of the AR-HUD 1 described later starts (S13), and a series of initial operation ends.

Figure 7:
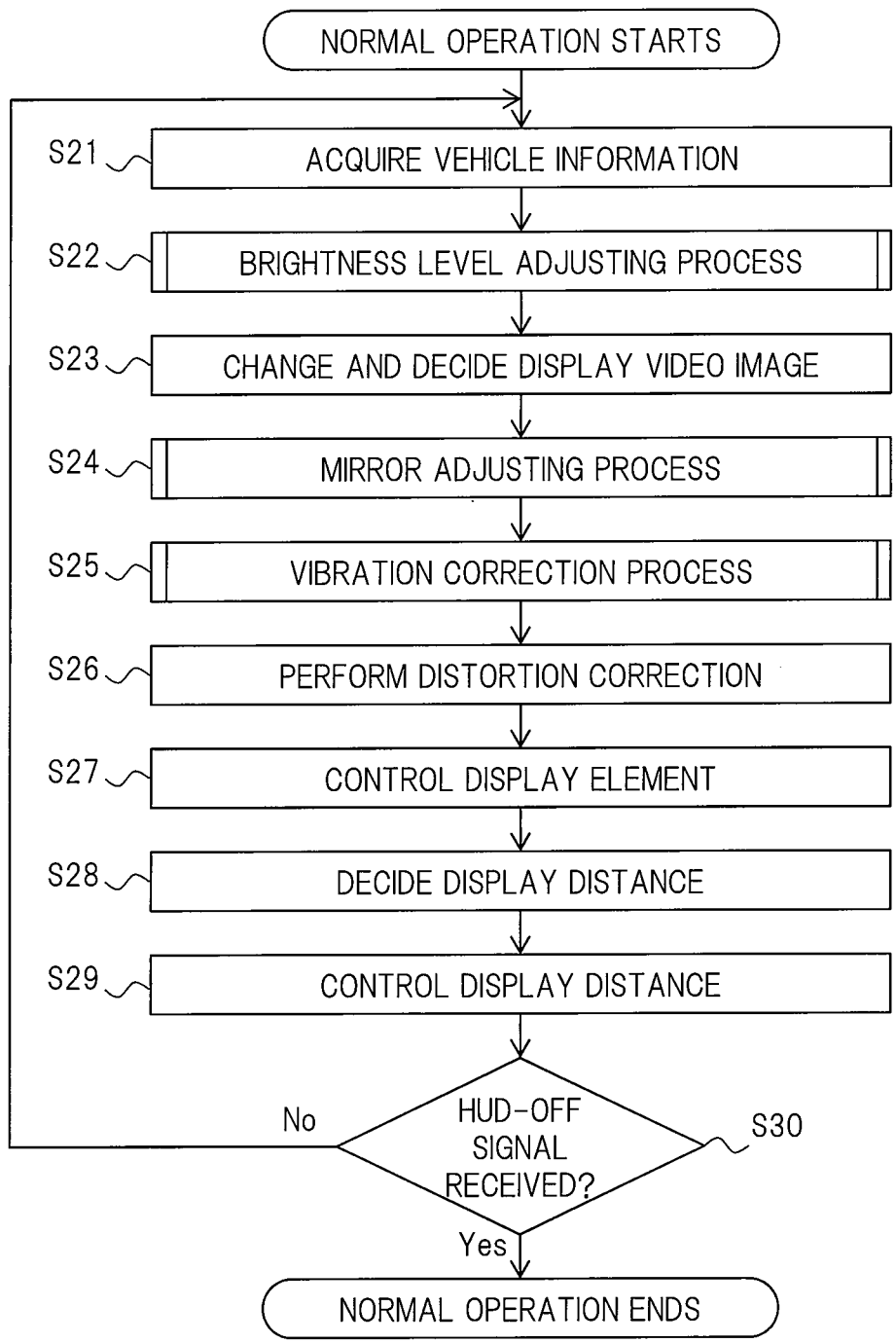
FIG. 7 is a flow chart illustrating an outline of an example of normal operation according to the one embodiment of the present invention.

FIG. 7 is a flow chart illustrating an outline of an example of normal operation in the head-up display apparatus of the present embodiment. Also in the normal operation, basic flow of processes is substantially the same as the initial operation illustrated in FIG. 6 described above. First, the AR-HUD 1 acquires vehicle information by the vehicle information acquisition unit 10 based on an instruction from the controller 20 (S21). Then, the controller 20 performs a brightness level adjusting process based on external light information acquired by the illuminance sensor 105, the chromaticity sensor 106, and the like, of the vehicle information 4 (S22).

Figure 8:
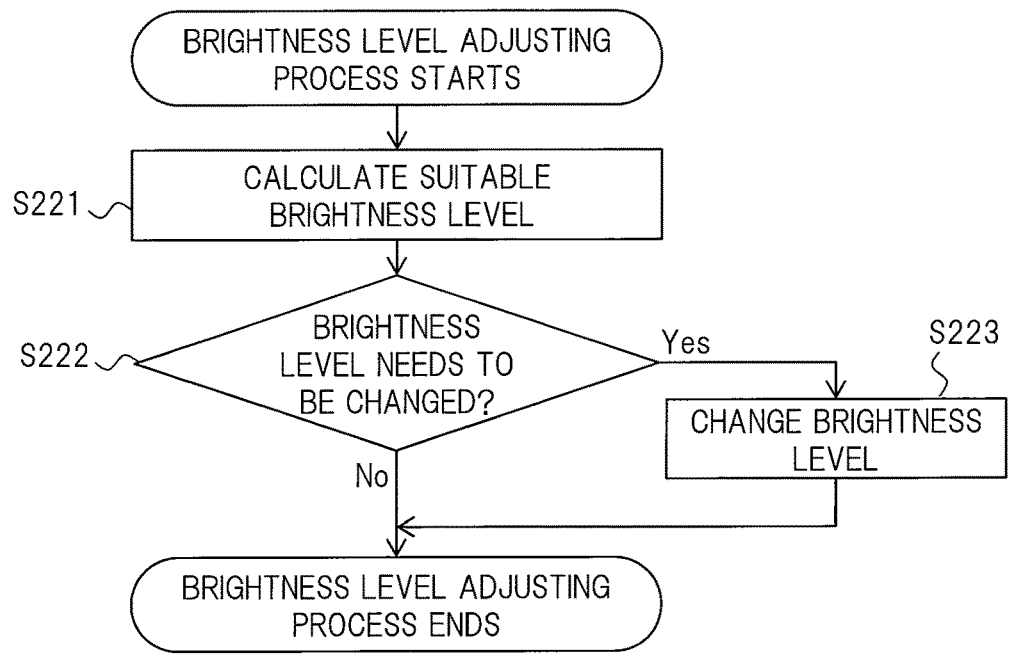
FIG. 8 is a flow chart illustrating an outline of an example of a brightness level adjusting process according to the one embodiment of the present invention.

FIG. 8 is a flow chart illustrating an outline of an example of the brightness level adjusting process in the head-up display apparatus of the present embodiment. When the brightness level adjusting process starts, first, a suitable brightness level is calculated based on the acquired external light information (S221). Then, by comparing the calculated brightness level with the brightness level currently set, it is determined whether or not the brightness level needs to be changed (S222). When the change is not necessary, the brightness level adjusting process ends as it is. Conversely, when the change is necessary, the light source adjusting unit 25 controls the light emitting amount of the light source 31 to set such that the brightness level becomes the brightness level after the change (S223), and the brightness level adjusting process ends. Note that, in the step S222, even when there is difference between the suitable brightness level calculated in the step S221 and the brightness level currently set, it may be determined that the brightness level needs to be changed only when the difference is a predetermined threshold value or more.

Subsequently, returning to FIG. 7, a current video image to be displayed as a virtual image is changed based on the latest vehicle information 4 acquired in the step S21 by the ECU 21, as needed, and a changed video image is decided and generated (S23). Note that there may be a large number of patterns in which display contents are changed based on the vehicle information 4 in accordance with contents of the acquired vehicle information 4, a combination thereof, etc. For example, various patterns maybe possible; a case in which numeral values of speed display which are displayed all the time are changed when the speed information is changed or a case in which an arrow figure for guide is displayed or deleted based on the navigation information or in which a shape, a display position, or the like of the arrow are changed.

Subsequently, in the present embodiment, adjustment and correction processes for maintaining visibility, suitability of the display contents, and the like are performed in accordance with the running condition of the vehicle 2. First, when it is required to adjust a position of the display region of the virtual image itself, an angle of the mirror 52 is changed via the mirror driver 50, and the mirror adjusting process of moving the display region of the virtual image up and down is performed (S24). Subsequently, the vibration correction process of correcting the display position of the video image in the display region with respect to vibration of the vehicle 2 is further performed (S25). Detailed contents of the adjustment and correction processes in the steps S24 and S25 will be described later.

Subsequently, after a process of correcting a distortion of the adjusted and corrected video image is performed by the distortion correction unit 26 (S26), the display element driver 27 drives and controls the display element 33 to form a video image to be projected (S27). Then, the ECU 21 or the display distance adjusting unit 28 calculates and decides the display distance of the virtual image (S28), and the display distance adjusting unit 28 drives the display distance adjusting mechanism 40 to control the display distance of the video image projected from the video image display 30 (S29).

In executing a series of normal operation described above, the power supply is turned OFF in association with stopping of the vehicle 2, the HUD-OFF signal is output to the AR-HUD 1, and the controller 20 determines whether or not this signal is received (S30). When the HUD-OFF signal is not received, the process returns to the step S21, and the series of normal operation is repeated until the HUD-OFF signal is received. When it is determined that the HUD-OFF signal is received, the series of normal operation ends.

<Mirror Adjusting Process>

Figure 9:
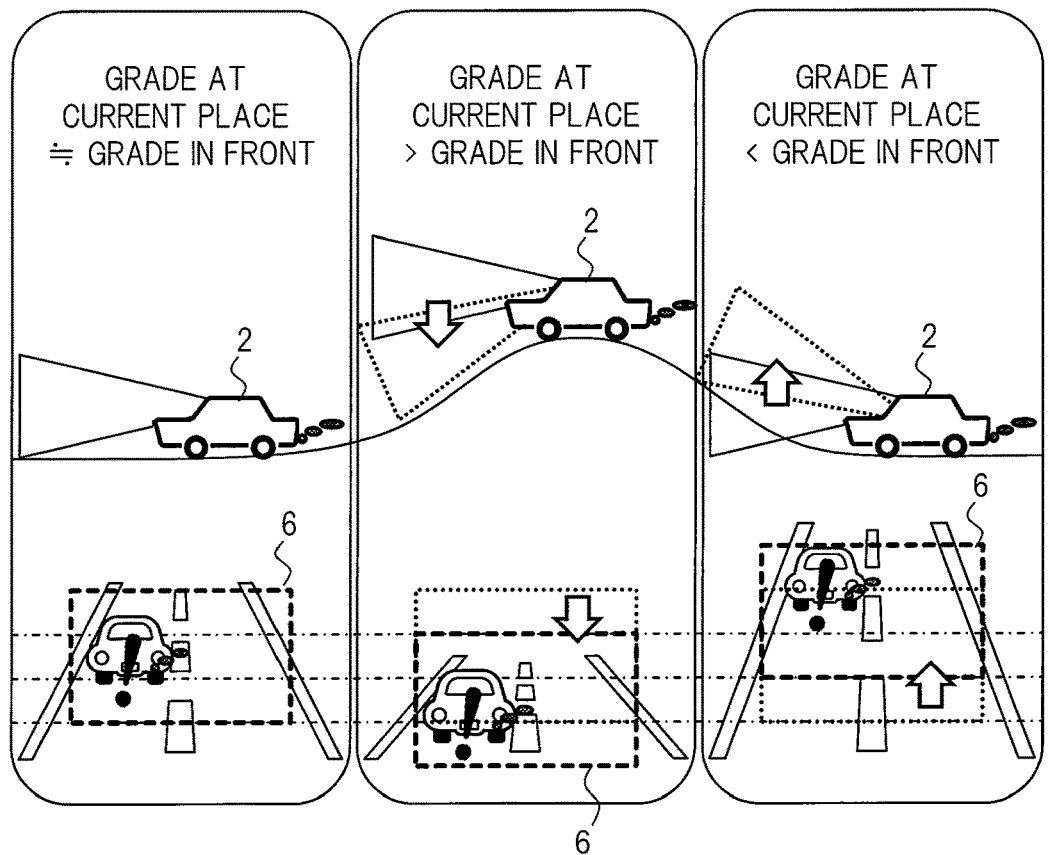
FIG. 9 is a diagram illustrating an outline of an example of adjusting a position of a display region of a virtual image up and down according to the one embodiment of the present invention.

FIG. 9 is a diagram illustrating an outline of an example of adjusting a position of the display region of the virtual image up and down in the head-up display apparatus of the present embodiment. For example, in each of the left, the center, and the right figures, a state in which a condition of a grade of a road on which the vehicle 2 is running and a condition of a line of sight of the driver 5 are seen in a side view is schematically illustrated on an upper part. Also, on a lower part, in each state, forward scenery outside the vehicle which is seen by the driver 5, and a condition of a position of the display region 6 (a rectangle frame of a broken line) of the virtual image which is displayed to be overlapped with the forward scenery are schematically illustrated.

In the left figure, as illustrated in the upper part thereof, a case in which the grade of the road at the current place of the vehicle 2 (in an advancing direction) and the grade of the forward road (in the advancing direction) are substantially the same, that is, a case in which the vehicle 2 is running on the road which is substantially flat is illustrated. In this case, as illustrated in the lower part of the figure, in order to display the virtual image (an exclamation mark or an image in the example of FIG. 9) to be overlapped with the forward scenery outside the vehicle (a forward vehicle running on the road in the example of FIG. 9) by the AR function, a position in the upward and downward direction of the display region 6 of the virtual image may remain a normal state. That is, the position of the display region 6 illustrated in the lower part of the left figure becomes a basic display position in the upward and downward direction of the display region 6.

In contrast, in the center figure, a case in which the grade of the road at the current place of the vehicle 2 (in the advancing direction) is larger than the grade of the forward road (in the advancing direction), that is, a case in which the vehicle 2 is running on the road where the forward road is a descending slope is illustrated. In this case, as illustrated in the upper part thereof, in order to put the forward road in a field of view of the driver 5 with respect to a height of the field of view of the driver 5 (a frame of a solid line in the figure) based on the grade at a position of the vehicle 2, the field of view needs to be moved in the downward direction (a frame of a dotted line in the figure).

Then, in this case, as illustrated in the lower part of this figure, if the display position of the display region 6 of the virtual image remains in the basic display position (a rectangle of the dotted line), it is not possible to overlap the virtual image with the forward scenery outside the vehicle by the AR function, and accordingly, it is required to move the display region 6 itself in the downward direction in order to display in the overlapping manner.

Similarly, in the right figure, a case in which the grade of the road at the current place of the vehicle 2 (in the advancing direction) is smaller than the grade of the forward road (in the advancing direction), that is, a case in which the vehicle 2 is running on the road where the forward road is an ascending slope is illustrated. In this case, as illustrated in the upper part of the figure, in order to put the forward road in the field of view of the driver 5 with respect to the height of the field of view of the driver 5 (a frame of the solid line in the figure) based on the grade at a position of the vehicle 2, the field of view needs to be moved in the upward direction (a frame of the dotted line in the figure). Then, also in this case, as illustrated in the lower part of this figure, if the display position of the display region 6 of the virtual image remains in the basic display position (a rectangle of the dotted line), it is not possible to overlap the virtual image with the forward scenery outside the vehicle by the AR function, and accordingly, it is required to move the display region 6 itself in the upward direction in order to display in the overlapping manner.

Thus, the condition in which the position of the display region 6 of the virtual image needs to be moved in the upward and downward direction in accordance with the running condition is not limited to a case in which there is a certain amount or more of a difference between the grade at the current place and the grade on the forward road illustrated in the example of FIG. 9. For example, when the speed of the vehicle 2 increases on a highway or the like, the line of sight of the driver 5 generally sees farther, comparing to the time of normal driving, and accordingly, the height of the field of view moves in the upward direction. Accordingly, for example, in order to overlap the virtual image with scenery outside the vehicle including other vehicles etc. which are present further ahead of the forward vehicle comparing to the time of normal driving, a need to move the display region 6 in the upward direction may be generated. The same also applies to a case or the like in which, when a posture and a body position of the driver 5 change in running the vehicle 2, for example, the height position of the eyes of the driver 5 itself changes, and as a result, the height of the field of view moves in the upward and downward direction.

In the present embodiment, in the mirror adjusting process in the step S24 of FIG. 7 described above, an angle of the mirror 52 is controlled by the mirror driver 50 in accordance with the running condition of the vehicle 2, and the position of the display region of the virtual image in the upward and downward direction is adjusted as illustrated in the example of FIG. 9.

Figure 10:
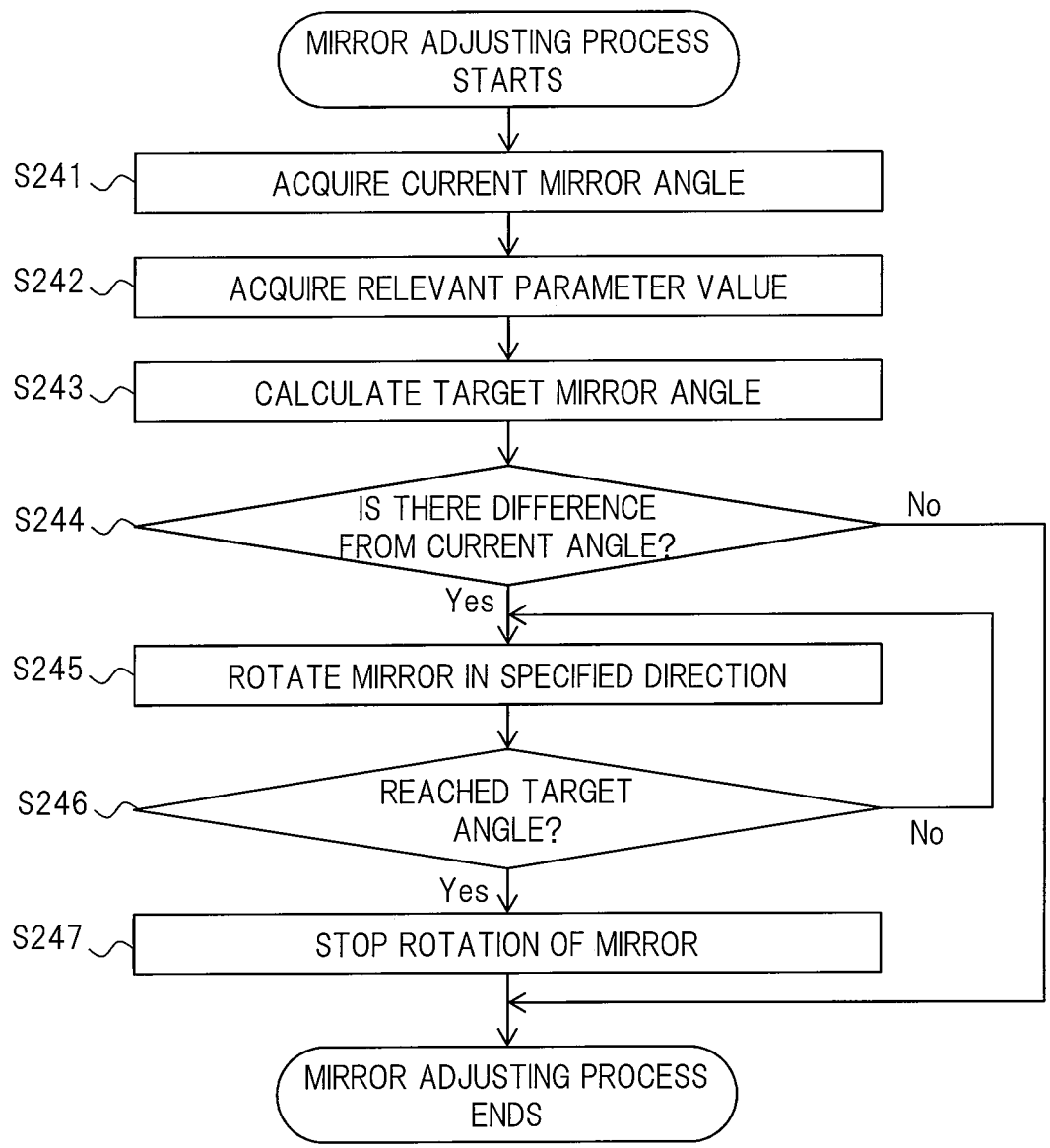
FIG. 10 is a flow chart illustrating an outline of an example of a mirror adjusting process according to the one embodiment of the present invention.

FIG. 10 is a flow chart illustrating an outline of the example of the mirror adjusting process in the step S24 of FIG. 7. When the mirror adjusting process starts, a current angle of the mirror 52 is first acquired (S241), and further, based on the vehicle information 4, a current value of a parameter relevant to adjustment of the angle of the mirror 52 (that is, adjustment of the display position of the display region of the virtual image) is acquired (S242).

A kind of parameter to be required may be different depending on under what conditions the display position of the display region is adjusted. For example, in the example of FIG. 9, as the relevant parameter value, a value indicating a difference between the grade at the current place of the vehicle 2 and the grade of the forward road (relative grade) is acquired. For example, it is possible to grasp the grade at the current place from information on an inclination of the vehicle 2 obtained by the acceleration gyro information. Also, by analyzing the camera video image information outside the vehicle, it is also possible to grasp the grade of the forward road. In addition, it is also possible to obtain the grades of the current place and the forward road based on three-dimensional road and topographical information and the like obtained from the navigation information.

Next, based on the parameter value acquired in the step S242, a target angle of the mirror 52 is calculated based on a reference, a condition, etc. determined in advance (S243). A kind of logic used to calculate the target angle based on the parameter may vary depending on the condition in which the display position of the display region is adjusted. For example, in the example of FIG. 9, when an absolute value of the relative grade between the current place and the forward road is a predetermined threshold value or more, the target angle of the mirror 52 is decided in accordance with a reference character of the relative grade. The predetermined threshold value described above can be set to, for example, 1/x (x is a predetermined value) of an FOV (Field Of View) of the display region of the virtual image in the upward and downward direction.

Note that, in the present embodiment, although it is configured such that the target angle of the mirror 52 is calculated based on the current parameter value acquired in the step S242, a condition in the near future is predicted based on information of history of the current parameter value and past values, and the target angle may be calculated based on the predicted result. For example, by analyzing a tendency of a transition of the values based on the history of the parameter values in the past, the parameter value in the near future may be predicted based on the tendency. Also, by analyzing the camera video image information ahead of and outside the vehicle, it is also possible to predict a condition around the vehicle 2 in the near future and to grasp a road condition ahead of the vehicle 2 based on the navigation information.

Next, presence/absence of a difference between the current angle of the mirror 52 acquired in the step S241 and the target angle of the mirror 52 acquired in the step S243 is determined (S244). Upon determination, for example, when the difference is a predetermined threshold value or more, it may be determined that the difference is present, and when the difference is less than the threshold value, it may be determined that the difference is not present. Also, it may be determined that the difference is present only if the state in which the difference is present continues for a certain period of time or more. Accordingly, it is possible to eliminate, from an object for adjustment of the mirror 52, an event in which the inclination of the vehicle 2 changes temporarily and instantaneously, for example, a case in which the vehicle 2 runs on a step such as a curb.

When it is determined that the difference in angle is not present in the step S244, the mirror adjusting process ends as it is. That is, the angle of the mirror 52 is not adjusted but remains the current angle. In contrast, when it is determined that the difference in angle is present, the mirror 52 is rotated in a specified direction so as to be the target angle (S245). In particular, a mirror adjusting signal for rotating the mirror 52 is output to the mirror driver 50. Then, it is determined whether or not the mirror 52 has reached the target angle (S246), and when it hasn't reached, the process returns to the step S245, and the rotation of the mirror 52 continues. That is, the mirror adjusting signal continues to be output to the mirror driver 50. In contrast, when the mirror 52 has reached the target angle, rotation of the mirror 52 is stopped (S247). That is, output of the mirror adjusting signal to the mirror driver 50 is stopped. Then, a series of mirror adjusting processes ends.

<Vibration Correction Process>

Figure 11:
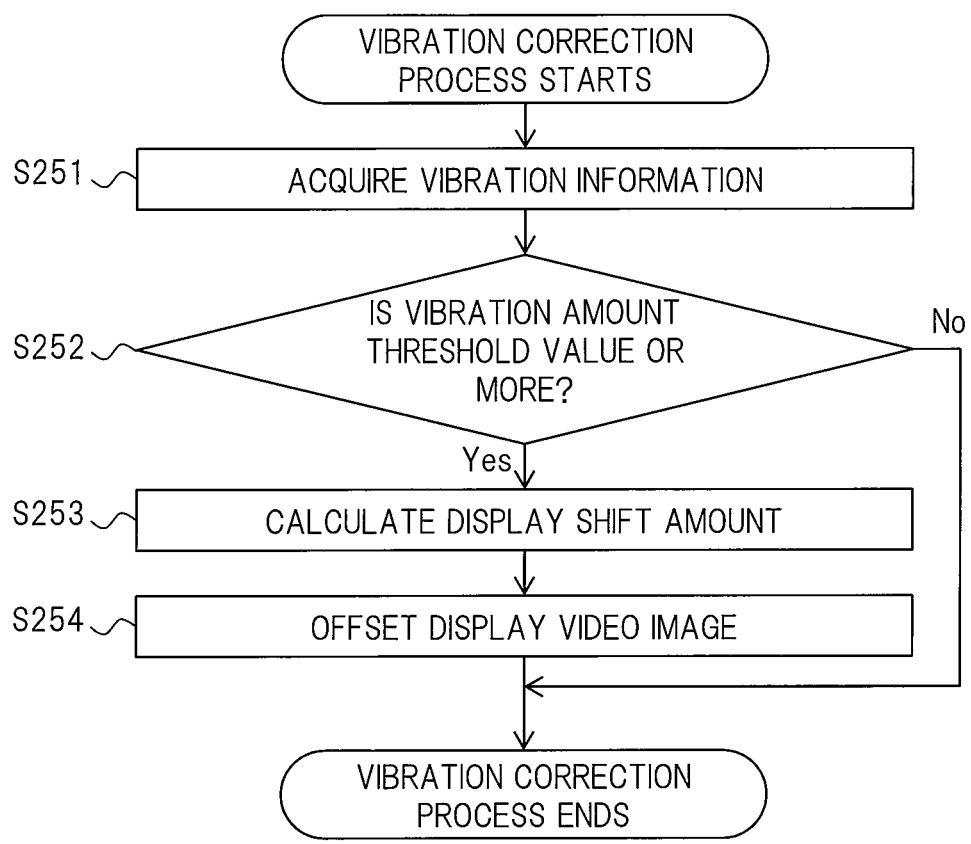
FIG. 11 is a flow chart illustrating an outline of an example of a vibration correction process according to the one embodiment of the present invention.

FIG. 11 is a flow chart illustrating an outline of an example of the vibration correction process in the step S25 of FIG. 7. When the vibration correction process starts, information on a vibration amount of the vehicle 2 is first acquired based on the vehicle information 4 (S251). For example, it is possible to grasp the vibration amount (an amount of an up-and-down motion in a short cycle in the vehicle 2) based on the acceleration gyro information, the camera video image information outside the vehicle, and the like. Note that, in the present embodiment, although the vibration information is acquired based on the current vehicle information 4, for example, by analyzing the camera video image information ahead of and outside the vehicle, a condition of a road surface around the vehicle 2 in the near future is predicted, and based on this, it may be configured to predict the vibration amount of the vehicle 2 in the near future.

Subsequently, it is determined whether or not the vibration amount acquired in the step S251 is a predetermined threshold value or more (S252). When the vibration amount is less than the threshold value, it is determined that the vibration is very small, and the vibration correction process ends as it is. That is, correction of the display video image in association with the vibration is not performed. In contrast, when the vibration amount is the threshold value or more, a display shift amount of the video image in the display region is calculated (S253). For example, based on a ratio between an actual height of the vehicle 2 and a height of the display region of the virtual image, the display shift amount of the video image in the display region is calculated from the vibration amount of the vehicle 2. Then, based on the calculated display shift amount, the display position of the video image in the display region is offset up and down (S254), and a series of vibration correction process ends.

<Display Distance Adjustment of Virtual Image>

When the display distance of the virtual image needs to be adjusted, the display distance adjusting unit 28 of the controller 20 drives the display distance adjusting mechanism 40 to adjust the display distance of the video image projected from the video image display 30. In the following, an adjusting method of the display distance of the virtual image in each unit of the display distance adjusting unit 28 and the display distance adjusting mechanism 40 illustrated in FIG. 5 will be described below.

<Functional Liquid Crystal Film>

FIGS. 12(a) and 12(b) are views illustrating an outline of an example of display distance adjustment using a functional liquid crystal film 401 in the head-up display apparatus of the present embodiment. In the example of FIG. 12, a plurality of the functional liquid crystal films 401 are used as a diffuser 41a. Then, as illustrated in each of FIGS. 12 (a) and 12(b), by changing a portion in a white state for each area of each of the functional liquid crystal films 401, a focus distance is changed for each area, so that the display distance of the virtual image (a distance between a position of the eyes of the driver 5 and the display position of the virtual image) is changed.

FIG. 13 is a view illustrating an outline of a configuration example of the diffuser 41a constituted by the functional liquid crystal films 401. The functional liquid crystal film 401 is a film capable of controlling a transmitted state and the white state by electricity. A part in the white state of the functional liquid crystal film 401 serves a function of the diffuser, and the video image projected by a projector 30a is formed at this part in the white state. In this present embodiment, it is assumed to control the plurality of functional liquid crystal films 401 so as to individually become the white state for each of a plurality of areas.

Returning to FIG. 12, in a configuration illustrated in the figure, the display position of the virtual image based on the video image projected from the projector 30a is decided in accordance with the distance between the part in the white state of each of the functional liquid crystal films 401 and the lens 42a. Accordingly, the plurality of functional liquid crystal films 401 are disposed such that the distance from each of the functional liquid crystal films 401 to the lens 42a becomes different, and regarding the video image projected from the projector 30a, any one of the functional liquid crystal films 401 is set in the white state for each area by the functional liquid crystal film ON/OFF controller 281 illustrated in FIG. 5, so that the display distance of the virtual image can be changed for each area.

In particular, for example, as illustrated in FIG. 12(a), for a subject area (an uppermost area, for example), only the functional liquid crystal film 401 which is disposed at the closest position to the lens 42a is set in the white state, and the other functional liquid crystal films 401 are set in the transmitted state, so that the display distance of the corresponding virtual image can be shortest. Conversely, as illustrated in FIG. 12(b), for the subject area (the uppermost area, for example), only the functional liquid crystal film 401 which is disposed at the farthest position from the lens 42a is set in the white state, and the other functional liquid crystal films 401 are set in the transmitted state, so that the display distance of the corresponding virtual image can be farthest.

Note that, although a case in which the video image to be displayed is provided with three areas in the upward and downward direction is exemplified in the examples of FIGS. 12 and 13, the number of areas is not limited to this also including examples to be described below, and the areas can be divided not only in the upward and downward direction, but also in the right and left direction as a matter of course. Also, the number of functional liquid crystal films 401 is also not limited to three illustrated in the figures and can be appropriately changed in accordance with the number of areas.

<Disposition of Plurality of Mirrors>

FIG. 14 is a view illustrating an outline of an example of display distance adjustment using a plurality of mirrors in the head-up display apparatus of the present embodiment. In the example of FIG. 14, a plurality of mirrors 51a are disposed between an LCD 30b and the lens 42a as illustrated, and a video image from the LCD 30b is reflected by each of the mirrors 51a which is different for each area to be incident on the lens 42a. Accordingly, a distance from the LCD 30b to the lens 42a is made different for each area, so that the display distance of the virtual image can be changed in accordance with this distance.

In particular, for example, as illustrated in FIG. 14, by displaying the video image on the LCD 30b in the area reflected by the mirror 51a (which is also the farthest from the lens 42a) disposed at the farthest position from the LCD 30b, it is possible to make the display distance of the corresponding virtual image farthest.

Conversely, by displaying the video image on the LCD 30b in the area reflected by the mirror 51a (which is also the closest to the lens 42a) disposed at the closest position from the LCD 30b, it is possible to make the display distance of the corresponding virtual image closest.

Note that, also in the example of FIG. 14, the number of mirrors 51a is not limited to three illustrated in the figure, but can be appropriately changed in accordance with the number of areas.

[Movable Lens]

FIG. 15 is a view illustrating an outline of an example of display distance adjustment using a movable lens in the head-up display apparatus of the present embodiment. In the example of FIG. 15, the video image projected from the projector 30a is formed by a diffuser 41b and then, incident on the mirror 52 via movable lenses 42b separately provided in a plurality of areas.

Here, each of the movable lenses 42b can be individually moved along an optical axis direction by the lens movable unit 282 and the lens movable mechanism 402 illustrated in FIG. 5. The display position of the virtual image based on the video image projected from the projector 30a is decided in accordance with the distance between the diffuser 41b and each of the movable lenses 42b. Thus, moving the movable lens 42b changes the focus distance for each area, so that the display distance of the virtual image can be changed.

In particular, for example, as illustrated in FIG. 15, as in the uppermost area, the movable lens 42b is moved to a position close to the diffuser 41b, so that it is possible to make the display distance of the corresponding virtual image closer. Conversely, as in the lowermost area, the movable lens 42b is moved to a position far from the diffuser 41b, so that it is possible to make the display distance of the corresponding virtual image farther.

Note that, also in the example of FIG. 15, the number of movable lenses 42b is not limited to three illustrated in the figure, but can be appropriately changed in accordance with the number of areas.

[Light Control Mirror]

FIGS. 16(a) and 16(b) are views illustrating an outline of an example of display distance adjustment using a light control mirror 51b in the head-up display apparatus of the present embodiment. In the example of FIG. 16, a plurality of light control mirrors 403 are disposed between the LCD 30b and the lens 42a so as to be in rows and columns when seen in a sectional direction as illustrated in the figures, thereby constituting the light control mirror 51b.

Then, as illustrated in FIGS. 16(a) and 16(b), changing a portion of the light control mirrors 403 to be set in the mirror state makes the distance from the LCD 30b to the lens 42a different for each area, and in accordance with this distance, it is possible to change the display distance of the virtual image.

FIG. 17 is a view illustrating an outline of a configuration example of the light control mirror 403. The light control mirror 403 is a component such as a film, a sheet, or a glass capable of controlling the transmitted state and the mirror state by electricity. The light control mirror 403 in the transmitted state transmits the video image from the LCD 30b, and only the light control mirror 403 in the mirror state reflects the video image in a direction of the lens 42a. In the present embodiment, it is assumed that the plurality of light control mirrors 403 disposed in rows and columns when seen in a sectional direction are controlled by the light control mirror ON/OFF controller 283 such that one light control mirror 403 only becomes the mirror state per a row and a column (each area).

In particular, for example, as illustrated in FIG. 16(*a*), for an area corresponding to a column of the light control mirrors 403 which is closest to the lens 42*a*, only the light control mirror 403 in the lowermost row is set to the mirror state, and the other light control mirrors 403 are set to the transmitted state, so that an optical path length from the LCD 30*b* to the lens 42*a* can be made shortest, whereby the display distance of the corresponding virtual image can be made closest. Conversely, for an area corresponding to a column of the light control mirrors 403 which is farthest from the lens 42*a*, only the light control mirror 403 in the uppermost row is set to the mirror state, and the other light control mirrors 403 are set to the transmitted state, so that an optical path length from the LCD 30*b* to the lens 42*a* can be made longest, whereby the display distance of the corresponding virtual image can be made farthest.

Also, for example, as illustrated in FIG. 16(*b*), for an area corresponding to a column of the light control mirrors 403 which is closest to the lens 42*a*, only the light control mirror 403 in the uppermost row is set to the mirror state, and for an area corresponding to a column of the light control mirrors 403 which is second closest to the lens 42*a*, only the light control mirror 403 in the lowermost row is set to the mirror state, and the other light control mirrors 403 are set to the transmitted state. Thus, optical path lengths from the LCD 30*b* to the lens 42*a* in these areas can be made relatively shorter, so that the display distances of the corresponding virtual images can be made closer. Conversely, for an area corresponding to a column of the light control mirrors 403 which is farthest from the lens 42*a*, only the light control mirror 403 in the middle row is set to the mirror state, and the other light control mirrors 403 are set to the transmitted state. As a result, an optical path length from the LCD 30*b* to the lens 42*a* can be made relatively longer than those in the other areas, so that the display distance of the corresponding virtual image can be made farther.

Note that, also in the examples of FIGS. 16 and 17, the number of light control mirrors 403 is not limited to three rows and three columns illustrated in the figures, but can be appropriately changed in accordance with the number of areas.

[Movable Diffuser]

FIG. 18 is a view illustrating an outline of an example of display distance adjustment using a movable diffuser in the head-up display apparatus of the present embodiment. In the example of FIG. 18, the video image projected from the projector 30*a* is formed by a movable diffuser 41*c* and then, incident on the mirror 52 via the lens 42*a*.

Here, the movable diffuser 41*c* can be moved and/or rotated along the optical axis direction by the diffuser movable unit 284 and the diffuser movable mechanism 404 illustrated in FIG. 5. The display position of the virtual image based on the video image projected from the projector 30*a* is decided in accordance with a distance and/or an inclination between the movable diffuser 41*c* and the lens 42*a*. Thus, moving and/or rotating the movable diffuser 41*c* can change the focus distance, thereby changing the display distance of the virtual image.

In particular, by moving and/or rotating the movable diffuser 41*c* at a position close to the lens 42*a*, the display distance of the virtual image can be made closer. Conversely, by moving and/or rotating the movable diffuser 41*c* at a position farther from the lens 42*a*, the display distance of the virtual image can be made farther.

[Movable Optical Filter]

FIGS. 19(*a*) and 19(*b*) are views illustrating an outline of an example of display distance adjustment using a movable optical filter in the head-up display apparatus of the present embodiment. In the examples of FIG. 19, the movable optical filter 43*a* is provided between the lens 42*a* and the diffuser 41*b*, and as illustrated in FIGS. 19(*a*) and 19(*b*), the movable optical filter 43*a* is inserted into or extracted from the optical path, thereby changing the focus distance for each area to change the display distance of the virtual image.

An optical filter is a component having a characteristic of changing a focus distance by a single optical member such as a lens or a combination. In the present embodiment, a plurality of optical filters each having a different refractive index are used in combination to form one optical filter having a different refractive index for each region, and at the same time, to constitute a movable optical filter 43*a* capable of being inserted into or extracted from the optical path. Since the focus distance of the optical filter is different for each region, the movable optical filter 43*a* is inserted into or extracted from the optical path by the optical filter movable unit 285 and the optical filter movable mechanism 405 illustrated in FIG. 5, so that the display distance of the virtual image can be changed for each area.

In particular, for example, as illustrated in FIG. 19(*a*), inserting the whole movable optical filter 43*a* into the optical path can make the focus distance of the optical filter corresponding to the lowermost area shortest and the display distance of the virtual image far, and at the same time, make the focus distance of the optical filter corresponding to the uppermost area longest and the display distance of the virtual image close. Also, for example, as illustrated in FIG. 19(*b*), the movable optical filter 43*a* is partially extracted such that the lowermost area does not pass through the optical filter, and accordingly, it is configured that the display distance of the virtual image can be decided by the distance between the diffuser 41*b* and the lens 42*a* for this area and the display distance of the virtual image in this area can be made farther than those in the other areas which pass through the optical filter.

Note that, also in the examples of FIG. 19, the number of regions whose focus distances in the movable optical filter 43*a* are different is not limited to three illustrated in the figures, but can be appropriately changed in accordance with the number of areas.

[Comb-Like Optical Filter]

FIG. 20 is a view illustrating an outline of an example of display distance adjustment using a comb-like optical filter in the head-up display apparatus of the present embodiment. In the example of FIG. 20, the video image projected from the projector 30*a* is formed by the diffuser 41*b* and then, incident on the mirror 52 via a comb-like optical filter 43*b* and the lens 42*a*.

The comb-like optical filter 43*b* is a component whose optical filter portion having the same function as the lens and capable of changing the display distance of the virtual image in accordance with the focus distance is provided in a comb-like shape. As illustrated in FIG. 20, for example, the video image projected from the projector 30*a* is made to correspond to each of the optical filter portion and a portion without the optical filter by a line of the video image (which is not limited to each one line, but can be for each arbitrary line), so that the display distance of the virtual image can be changed by a line.

In particular, the display distance of the virtual image based on the video image of the line corresponding to the optical filter portion can be made closer, and the display distance of the virtual image based on the video image of the line corresponding to the portion without the optical filter can be made farther.

As described above, according to the head-up display apparatus of the one embodiment of the present invention, in accordance with the running condition of the vehicle 2, even in a case in which it is not possible to overlap the virtual image with the scenery in front of the vehicle 2, the display position of the display region itself of the virtual image is adjusted dynamically in the upward and downward direction, so that the virtual image can be suitably overlapped with the scenery in front of the vehicle 2 to achieve the AR function. Further, in accordance with the running condition and the like, the display distance of the virtual image can be also suitably adjusted.

<Display of Navigation Information>

According to the above description, for example, in FIGS. 7 to 10 described above, there have been descriptions in which display of the navigation information can have various patterns, and further, by the mirror adjusting process and the like for changing the display position thereof, elevation and depression angles of the navigation display are changed in accordance with the road shape. However, in the head-up display apparatus of the present invention, it became clear that, when the above-described navigation display is displayed on the road in an overlapping manner, a case in which it is hard to see the navigation display due to the shape of the road occurs.

In the following, a case in which it is hard to see the navigation display due to the shape of the road and a countermeasure thereof which have been examined by the inventors of the present invention will be described in detail.

First, in FIGS. 21(a) and 21(b), a state of normal display when the vehicle 2 is running on a flat road (see FIG. 21(b)) is illustrated. In this state, as illustrated in FIG. 21(a), a navigation display 351 composed of a plurality of guide arrows indicating an advancing direction of the vehicle is displayed to be overlapped over the road in front of the windshield 3 inside an HUD display region 35 of a substantially center portion of the windshield 3 as the navigation display 351 is looked down from the driver. Note that, in the figure, the arrow serving as a display object is displayed by changing a size according to a distance from the vehicle 2, and in the present example, the advancing direction is turning left ahead of the vehicle. Also, a reference character 34 in the figure indicates a dashboard.

Subsequently, in FIGS. 22(a) and 22(b), a state of display when the vehicle 2 is running on an ascending slope and around a top of the ascending slope (see FIG. 22(b), for example) is illustrated, and in such state, as apparent also from FIG. 22(a), the navigation display 351 displayed in the HUD display region 35 in the windshield 3 is collapsed, and as a result, it becomes hard for the driver to see the navigation display 351.

Also, as illustrated in FIGS. 23(a) and 23(b), when the vehicle 2 is running on a descending slope and around an end of the descending slope (see FIG. 23(b)), the road in front of the windshield 3 is upwardly out of the HUD display region 35, and parts indicating the left turn of the navigation display 351 cannot be displayed.

Further, when the vehicle gets close to a curve, as illustrated in FIG. 24, the road in front of the windshield 3 is laterally out of the HUD display region 35 (in this example, on the right side), and similarly to the above, the parts indicating the left turn of the navigation display 351 cannot be displayed.

In addition, also when the vehicle gets close to the ascending slope, as illustrated in FIG. 25, a point where the vehicle turns right or left (right or left turn point) on the road opposite to the top of the ascending slope is hid from the slope and not present in the HUD display region 35, whereby various problems such as a case in which the navigation display 351 at the corresponding point cannot be performed have been found.

In view of this, countermeasures which have been examined to solve the above-described problems will be described in detail with reference to the drawings below.

First, each of FIGS. 26(a) and 26(b) particularly illustrates a countermeasure for solving the problem illustrated in FIG. 22 described above, and herein, the navigation display 351 composed of the plurality of guide arrows indicating the advancing direction of the vehicle is displayed to be overlapped over the road as the navigation display 351 is looked up from the driver. Note that the navigation display in the case of turning left is displayed in FIG. 26(a) and the navigation display in the case of turning right is displayed in FIG. 26(b). In other words, the arrows constituting the navigation display 351 in the HUD display region 35 are displayed so as to be positioned at an upper portion of the HUD display region 35 as the arrows are closer to the vehicle, while they are displayed so as to be positioned around the top of the slope as they are farther from the vehicle. Then, display of turning a left or right corner is displayed so as to be positioned around the top of the slope.

Next, each of FIGS. 27(a) and 27(b) illustrates another countermeasure for solving the problem generated in running on the ascending slope and around the top of the ascending slope described above, and as apparent from these figures, the countermeasure is particularly effective to a case in which, since the HUD display region 35 in the windshield 3 is positioned above the top of the slope, the navigation display 351 onto the road including the corner is impossible. Also in this case, similarly to the above, the navigation display 351 composed of the plurality of guide arrows indicating the advancing direction of the vehicle is displayed to be overlapped over the road as the navigation display 351 is looked up from the driver. Note that the navigation display in the case of turning left is illustrated in FIG. 27(a) and the navigation display in the case of turning right is illustrated in FIG. 27(b). Then, in this case, display of turning a left or right corner is displayed so as to be positioned on a lower end of the HUD display region 35.

Figure 23:
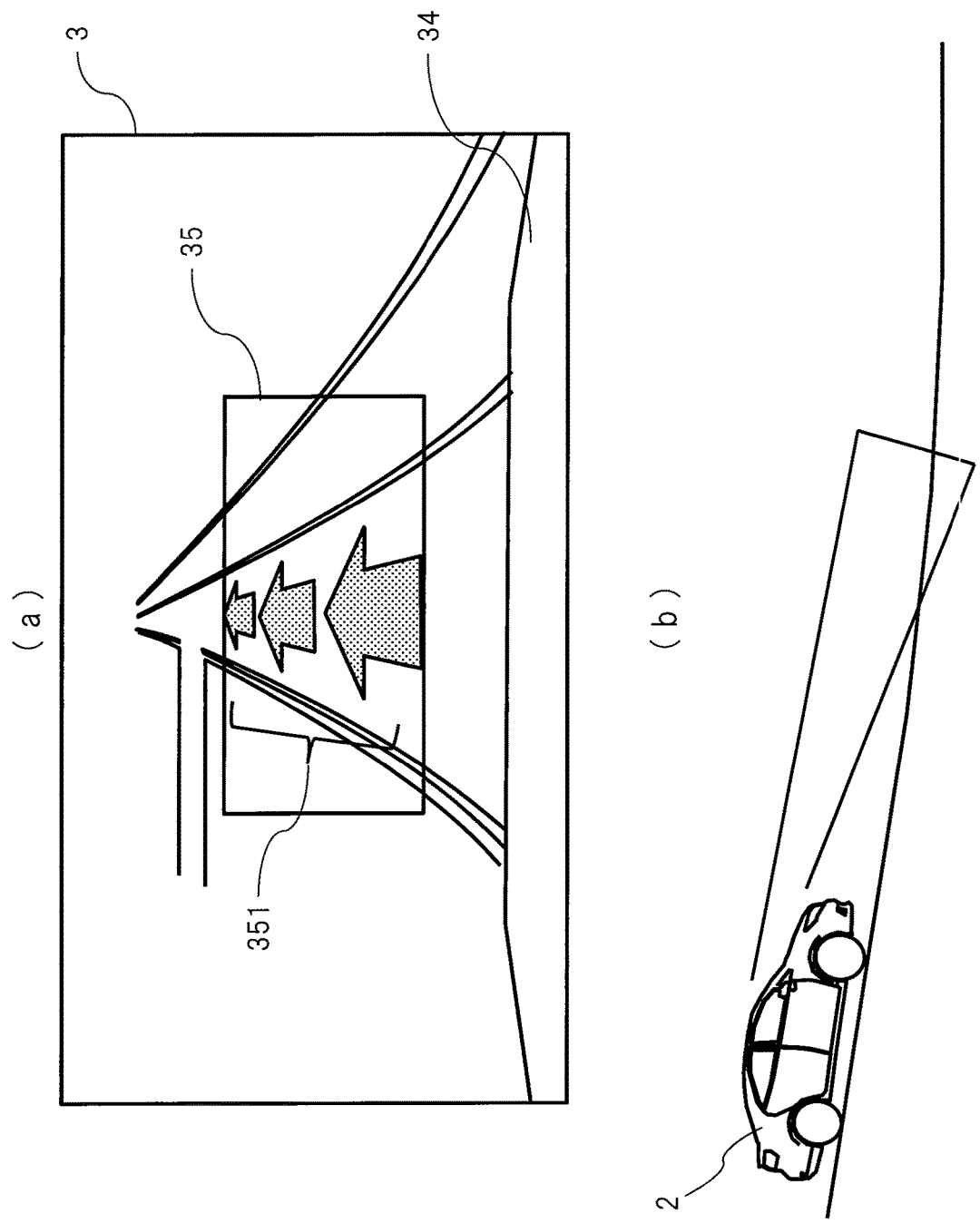

Subsequently, each of FIGS. 28(a) and 28(b) particularly illustrates a countermeasure for solving the problem illustrated in FIG. 23 described above, and particularly, display of turning a left or right corner out of the HUD display region 35 is performed by using an upper end of the HUD display region 35. Note that, also in this case, FIG. 28(a) illustrates the navigation display in the case of turning left and FIG. 28(b) illustrates the navigation display in the case of turning right. Note that, in this case, the display of turning the left or right corner described above is performed with arrows having a size corresponding to a distance from the vehicle, and the like. Further, the display of these corners is performed with arrows 352 in a different mode from the arrows 351 indicating straight advance along the road, thereby enabling display emphasizing that the arrows 352 are additional information to the driver. Note that the different display mode of these arrows 352 includes display in a different color or blinking display, for example.

In addition, each of FIGS. 29(a) to 29(d) particularly illustrates a countermeasure for solving the problem illustrated in FIG. 24 described above. That is, under a condition in which the vehicle gets close to a curve and the road is laterally out of the HUD display region 35, similarly to the above, display of turning a left or right corner is performed by using the arrows 352 in the different mode from the arrows 351 indicating straight advance along the road. Note that the display of the arrows 352 in the different mode is performed at a left side end or a right side end of the HUD display region 35. In this case, FIG. 29(a) illustrates the navigation display in the case of turning left at the right curve, FIG. 29(b) illustrates the navigation display in the case of turning right at the right curve, FIG. 29(c) illustrates the navigation display in the case of turning left at the left curve, and FIG. 29(d) illustrates the navigation display in the case of turning right at the left curve. Also in this case, the display of the arrows 352 in the different mode can be performed by setting the color thereof to be different from the arrows 351 or by blinking in order to emphasize that the arrows 352 are additional information to the driver.

Also, a countermeasure for a curve around the ascending slope is illustrated in each of FIGS. 30(a) to 30(d). This countermeasure is made by combining the countermeasure illustrated in FIG. 27 (or FIG. 26) above with the countermeasure illustrated in FIG. 29 above and is to display the navigation display 351 composed of the plurality of guide arrows described above to be overlapped over the road as the navigation display 351 is looked up from the driver, and at the same time, to display the arrows 352 in the different mode from the navigation display 351 so as to be in the proximity of four corners such as left, right, upper, and lower corners in the HUD display region 35, under a condition in which the road is downwardly out of the HUD display region 35. Note that, also in this case, FIG. 30(a) illustrates the navigation display in the case of turning left at the right curve, FIG. 30(b) illustrates the navigation display in the case of turning right at the right curve, FIG. 30(c) illustrates the navigation display in the case of turning left at the left curve, and FIG. 30(d) illustrates the navigation display in the case of turning right at the left curve.

Figure 29:
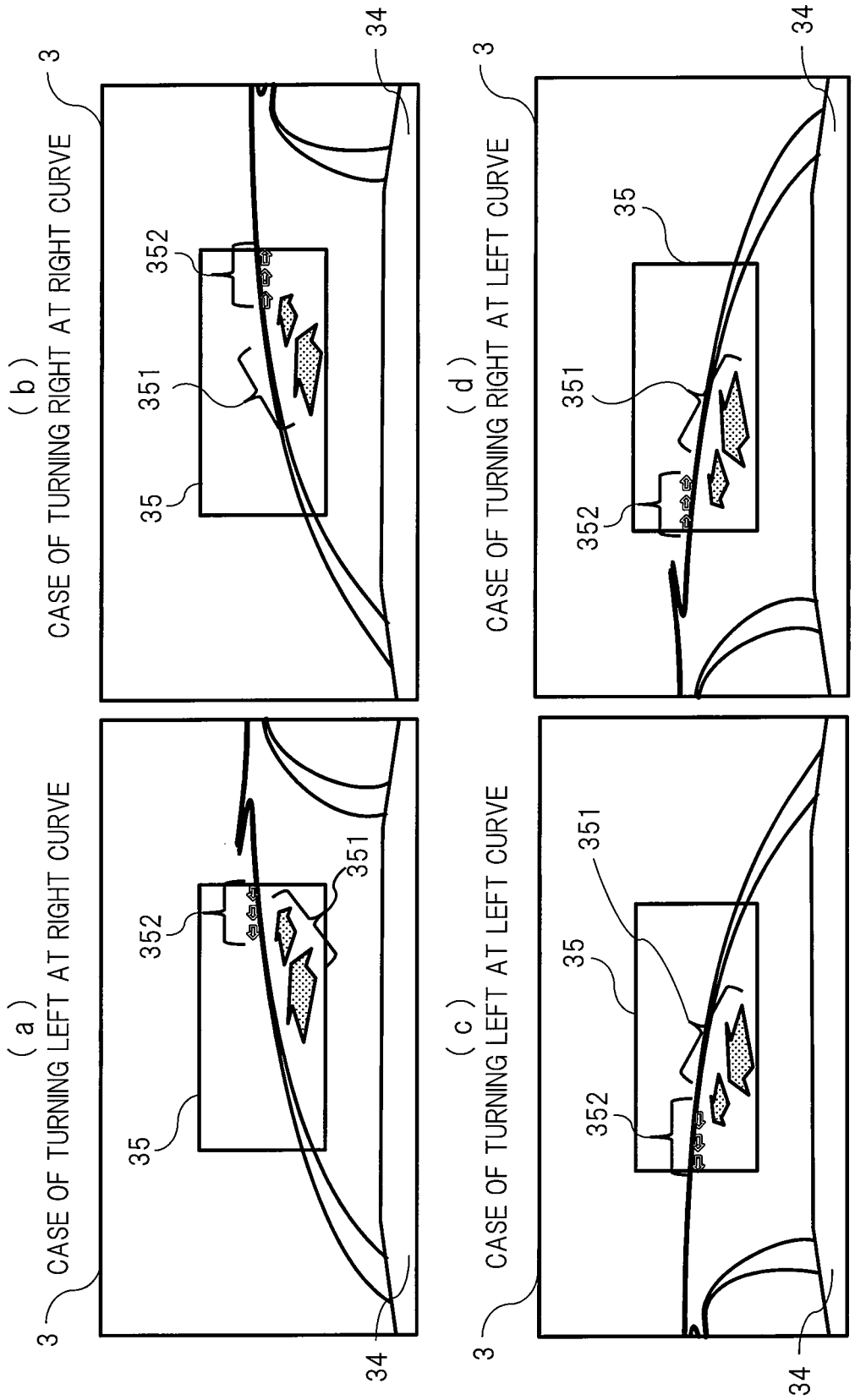
Figure 30:
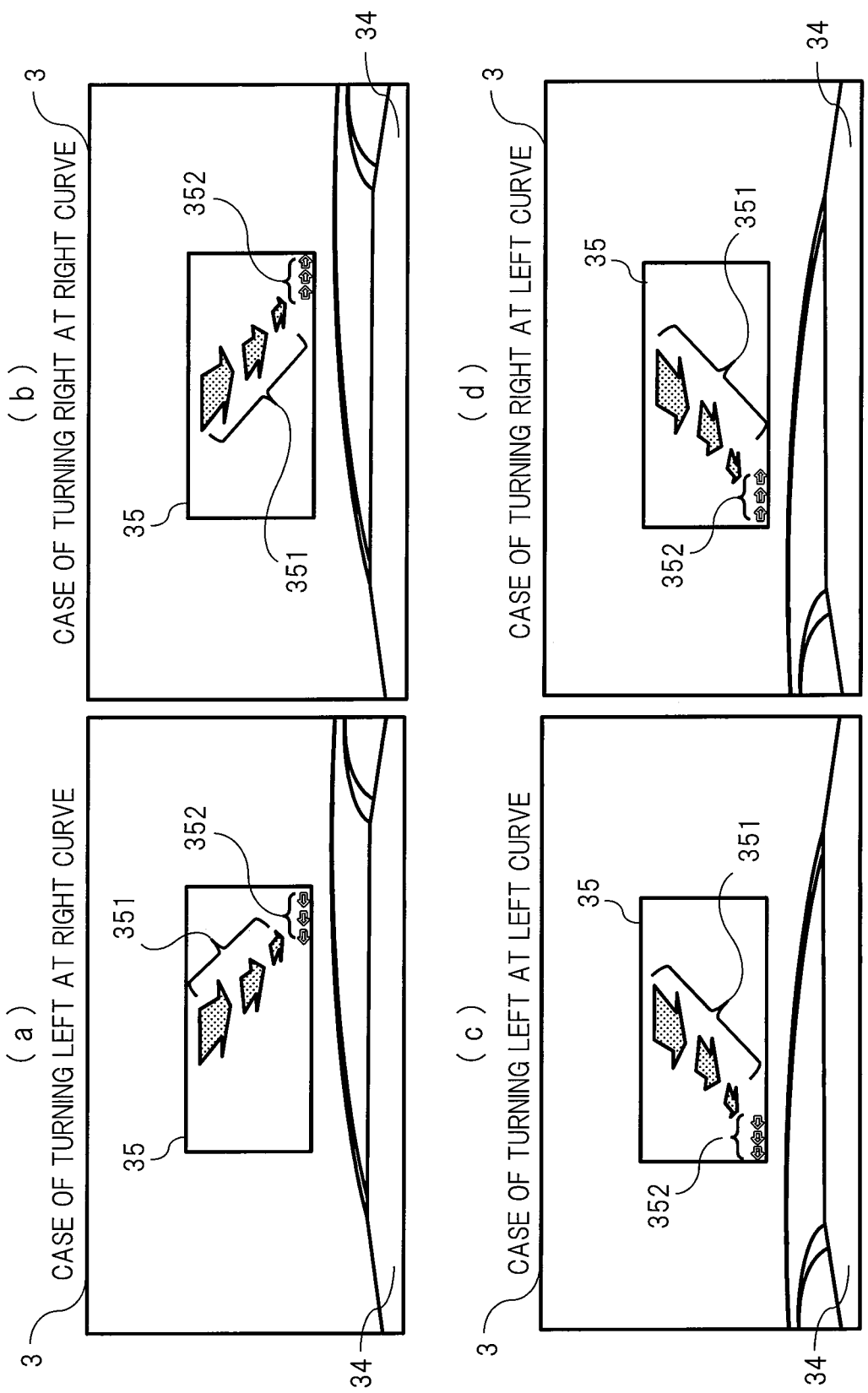

Note that, in a case in which the countermeasure illustrated in FIG. 26 is combined with the countermeasure illustrated in FIG. 29, a position of the arrow indicating a corner in the HUD display region 35 is only different (that is, is in a substantially center portion in a height direction of the HUD display region), and illustration thereof is omitted herein.

Then, each of FIGS. 31(a) to 31(d) illustrates a countermeasure at a curve around the end of the descending slope.

Similarly, also in this countermeasure, in the HUD display region 35, the navigation display 351 composed of the plurality of guide arrows is displayed to be overlapped over the road, and at the same time, display of turning a left or right corner out of the HUD display region 35 is performed with the arrows 352 in the different mode from the navigation display 351 such that the arrows 352 are positioned in the proximity of four corners such as left, right, upper, and lower corners in the HUD display region 35. Note that, also in this case, FIG. 31(a) illustrates the navigation display in the case of turning left at the right curve, FIG. 31(b) illustrates the navigation display in the case of turning right at the right curve, FIG. 31(c) illustrates the navigation display in the case of turning left at the left curve, and FIG. 31(d) illustrates the navigation display in the case of turning right at the left curve.

Subsequently, as one specific example for executing display of the navigation information described above in detail, that is, an operation of changing the navigation display depending on a shape of a road, a flow chart of software therefor is illustrated in FIG. 32.

Note that this software is, for example, stored in a memory in the controller 20 in advance to be executed by the ECU 21 (see FIGS. 3 to 5, for example) in the process (S23) of changing and deciding display video image in FIG. 7 described above.

As illustrated in FIG. 32, first, HUD normal operation is received by the ECU 21 (S311), and it is determined whether or not a distance to a corner where the vehicle turns left or right (referred to as "right or left turn point") is less than a predetermined threshold value (S312). As a result, in the case of "no," the process returns to the HUD normal operation in the step S311 (S313). Note that the predetermined threshold value herein is, for example, a distance from the own vehicle to the left or right turn point and a distance for performing the navigation display to be overlapped with the road, and is set to 100 m by way of example. In other words, when the distance to the left or right turn point is 80 m, the navigation display of the left or right turn point is performed. When the distance to the left or right turn point is 120 m, the navigation display of the left or right turn point is not performed.

On the other hand, when the result of determination in the above step S312 is "yes," that is, when the navigation display is performed, determination whether or not a position of the right or left turn point in a perpendicular direction is in the HUD display region described above is further performed (S314). Here, the position of the right or left turn point in the perpendicular direction means the position of the right or left turn point in the HUD display region 35 disposed in the substantially center portion of the windshield 3 of the vehicle 2, as illustrated in FIGS. 21 to 31 described above, that is, the position in the longitudinal direction.

When a result of determination in this step S314 is "yes," that is, when it is determined that the position of the right or left turn point in the perpendicular direction is in the HUD display region (see FIGS. 21 and 22, for example), it is further determined whether or not the right or left turn point is at a position where the driver cannot see due to a bump shape of the road (S315). Also when a result of determination in this step S315 is also "yes," that is, when it is determined that the right or left turn point is at a position where the driver cannot see due to the bump shape of the road (see FIGS. 25 and 30, for example), it is further determined whether or not the right or left turn point is on the left side or the right side of the HUD display region (S316). Then, when a result is also "yes," that is, when it is determined that the right or left turn point is outside the HUD display region, for example, the countermeasure illustrated in FIG. 30 described above (note that it differs in that a height of the corner is in the substantially center portion in the HUD display region) is performed (S317). On the other hand, when the result of determination is "no," that is, when it is determined that the right or left turn point is inside the HUD display region, the countermeasure illustrated in FIG. 26 described above is performed (S318).

Meanwhile, when the result of determination in the step S315 described above is "no," that is, when the driver can see the right or left turn point regardless of the bump shape of the road, similarly to the step S316 described above, it is determined whether or not the right or left turn point is on the left side or the right side of the HUD display region (S319). When a result of determination is "yes," that is, when it is determined that the right or left turn point is outside the HUD display region, the countermeasure illustrated in FIG. 29 described above is performed (S320). On the other hand, when the result of determination is "no," that is, when it is determined that the right or left turn point is inside the HUD display region, the normal display illustrated in FIG. 21 described above is performed (S321).

Further, when the result of determination in the above step S314 is "no," that is, when it is determined that the position of the right or left turn point in the perpendicular direction is not in the HUD display region (see FIGS. 23 to 31, for example), it is further determined whether or not the right or left turn point is below the lower end of the HUD display region (S322). When a result of determination is "yes," that is, when it is determined that the right or left turn point is below the HUD display region, it is further determined whether or not the right or left turn point is on the left side or the right side of the HUD display region (S323). When a result of determination is "yes," display of the countermeasure illustrated in FIG. 30 described above is performed (S324). On the other hand, when the result of determination is "no," the normal display illustrated in FIG. 27 described above is performed (S325).

Also, when the result of determination in the above step S322 is "no," that is, when it is determined that the right or left turn point is above the HUD display region, it is further determined whether or not the right or left turn point is on the left side or the right side of the HUD display region (S326). When a result of determination is "yes," display of the countermeasure illustrated in FIG. 31 described above is performed (S327). On the other hand, when the result of determination is "no," the normal display illustrated in FIG. 28 described above is performed (S328).

That is, according to the processes of the flow chart described above, by changing the mode of the navigation display (including a position in a horizontal direction and a vertical direction in the HUD display region) in accordance with the shape of the road, the head-up display apparatus capable of displaying the virtual image in accordance with the running condition of the vehicle such that the virtual image is suitably overlapped with the actual scenery can be achieved.

Note that it is a matter of course for those skilled in the art that the shape of the road which variously changes in the windshield 3 in the embodiments described above can be achieved by a method of analyzing an image and the like by taking in grade information of the road from the navigation information in FIG. 1, taking in video image information ahead of the vehicle from the camera (outside the vehicle) 116 in FIG. 3, and further, although not illustrated, taking in video image information from the camera provided in a vicinity of the eyes (that is, an eye point) of the driver so as to face ahead of the vehicle, among the vehicle information 4 described above.

<Monocular Vision/Binocular Vision Control of Navigation Information Display>

Next, in addition to the above-described navigation display in which changes are made in accordance with the shape of the road, further embodiment in which dimensions/shape of an eye box is controlled and switching of monocular vision/binocular vision is performed will be described in detail with reference to FIGS. 33 to 36 below.

Figure 34:
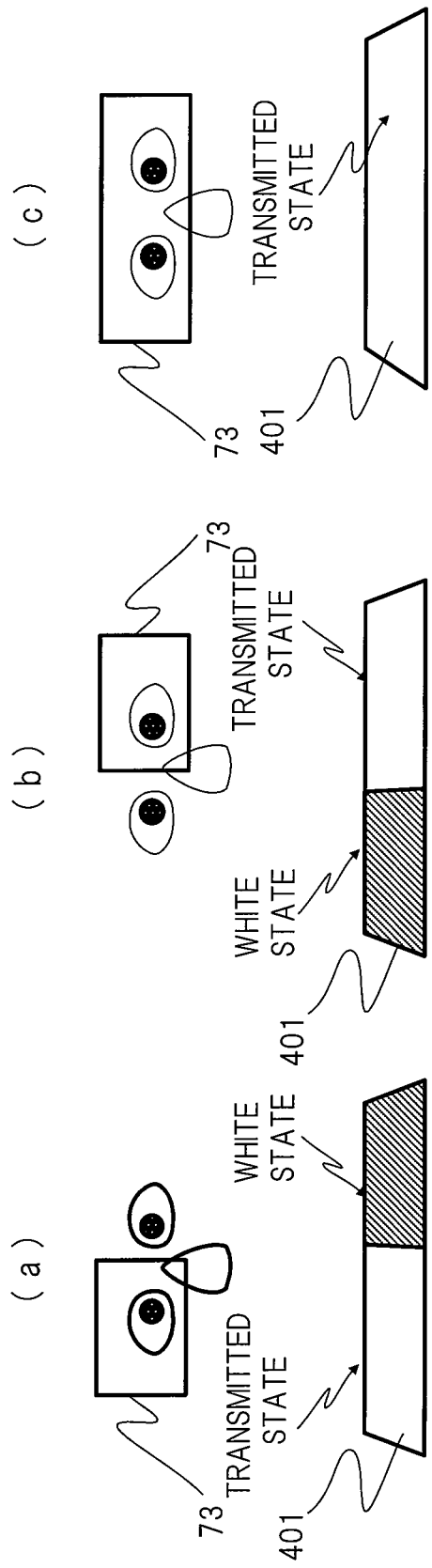

Note that the eye box represents a range of a viewpoint in which display of the video image in the HUD can be visually recognized, and as illustrated in FIG. 34, the functional liquid crystal film 401 disposed on an upper surface of the dashboard can control the eye box individually by dividing the film 401 into right and left areas. For example, when the monocular vision is suitable and set to the right eye according to suitability determination, the right half of the functional liquid crystal film is set to the white state as illustrated in FIG. 34(a). This block of the video image light results in projection of the video image light only onto the right eye, and as a result, the video image can be seen with the single eye on the right side. Note that, in FIG. 33, this eye box is indicated by a broken line 73 at a position directly before both eyes 5 of the driver.

In this embodiment, as illustrated in FIG. 33, the video image light projected from the projector 30a is reflected to the mirror 52 through various kinds of optical members 41c and 42a and further, passes through the functional liquid crystal film 401 described above, and then, the video image light of the navigation display reflected on the windshield 3 is projected onto the eyes of the driver. As a result of this, the driver can recognize the navigation display in front of the windshield 3 as the virtual image. Note that, although an example in which the half of the functional liquid crystal film is set to the white state in order to block the video image light is indicated in this embodiment, it is sufficient if the film does not transmit the light, and the other colors such as grey are applicable.

Meanwhile, in general, when a three-dimensional video image is seen (or watched), the following things have been pointed out. More specifically, (1) when the three-dimensional video image is watched in a bright room, visually induced motion sickness may be alleviated. (2) Since there is a fusional limit, when a parallax is increased to a certain extent or more, the right eye and the left eye do not fuse causing a double image, thereby failing to achieve stereoscopic view. (3) When both eyes are inclined with respect to a display surface, difference between the top and the bottom of the video image seen by the right and left eyes becomes large, and as a result, fusion becomes hard, causing eye fatigue.

Further, (4) as a point to note when a stereoscopic video image is used in a VDT (Visual Display Terminal) operation, particularly, the following things have been pointed out. That is, (4-1) a series of operations should not exceed one hour. (4-2) Operation break time for substantially 10 to 15 minutes should be provided between continuous operations. (4-3) Substantially one or two short breaks should be provided in a series of operation times.

In view of this, in the head-up display apparatus serving as the present invention taking into account the things described above, particularly in display of the navigation information, by controlling switching of a size/shape of the eye box 73, that is, switching between the monocular vision by either of the right or left eye (see FIG. 34(a) or 34(b)) and the binocular vision by both of the right and left eyes (see FIG. 34(c)) (referred to as "monocular vision/binocular vision control" below) by control of the functional liquid crystal film 401, a countermeasure for reducing a burden of the driver who continuously keeps watching the virtual image to be three-dimensionally displayed in the HUD display region 35 in front of the windshield 3 has been examined.

As a result of the examination, the following candidates have been provided as a scene (condition) of switching the size/shape of the eye box:

when the virtual image (≈distance to an object) is far (or close).

when inclination of a face of the driver exceeds a predetermined threshold value.

when a continuous driving time exceeds a predetermined threshold value.

when brightness in a vehicle room is less than a predetermined threshold value.

when it is hard to keep a quality of parallax video image (for example, by adjusting the HUD display region 35 up and down, adjustment of the virtual image distance is not made in time when the virtual image reflected on a windshield having a large curvature is seen, and the like).

when it is impossible to display the virtual image in a sense of distance corresponding to a distance to an object (for example, when the number of objects having different distances outside the adjustable region exceeds the number of independent virtual image distance adjustments, and the like).

In addition to the above, the following is further provided: a size/shape of the eye box is changed so as to avoid direct sunlight (when not using, an entire region is made non-transparent, preventing an inside of the HUD from being heated by external light or reflection of the external light by the display screen).

Next, specific contents of the eye box control including the monocular vision/binocular vision control described above based on the examination results by the present inventors described above will be described in detail with reference to FIGS. 35 and 36.

FIG. 35 illustrates a flow chart of process contents of the eye box control, and first, when the eye box control process starts, a determination result of a monocular vision/binocular vision suitability determination process described in detail below is taken in (S260).

Subsequently, based on the determination result described above, it is determined whether or not the monocular vision is suitable (S261). When a result of this determination is "Yes," it is further determined whether or not the monocular vision is set to the right eye (S262). When a result of this determination is "Yes," the eye box is changed such that the left eye is out of the eye box (S263: see FIG. 34(*a*)), and a series of processes ends. On the other hand, when the result of the determination in the step S262 is "No," the eye box is changed such that the right eye is out of the eye box (S264: see FIG. 34(*b*)), and a series of processes ends.

Meanwhile, when the result of the determination in the step S261 is "No," the eye box is changed such that a size of the eye box is largest (S265: see FIG. 34(*c*)), and a series of processes ends.

Figure 36:
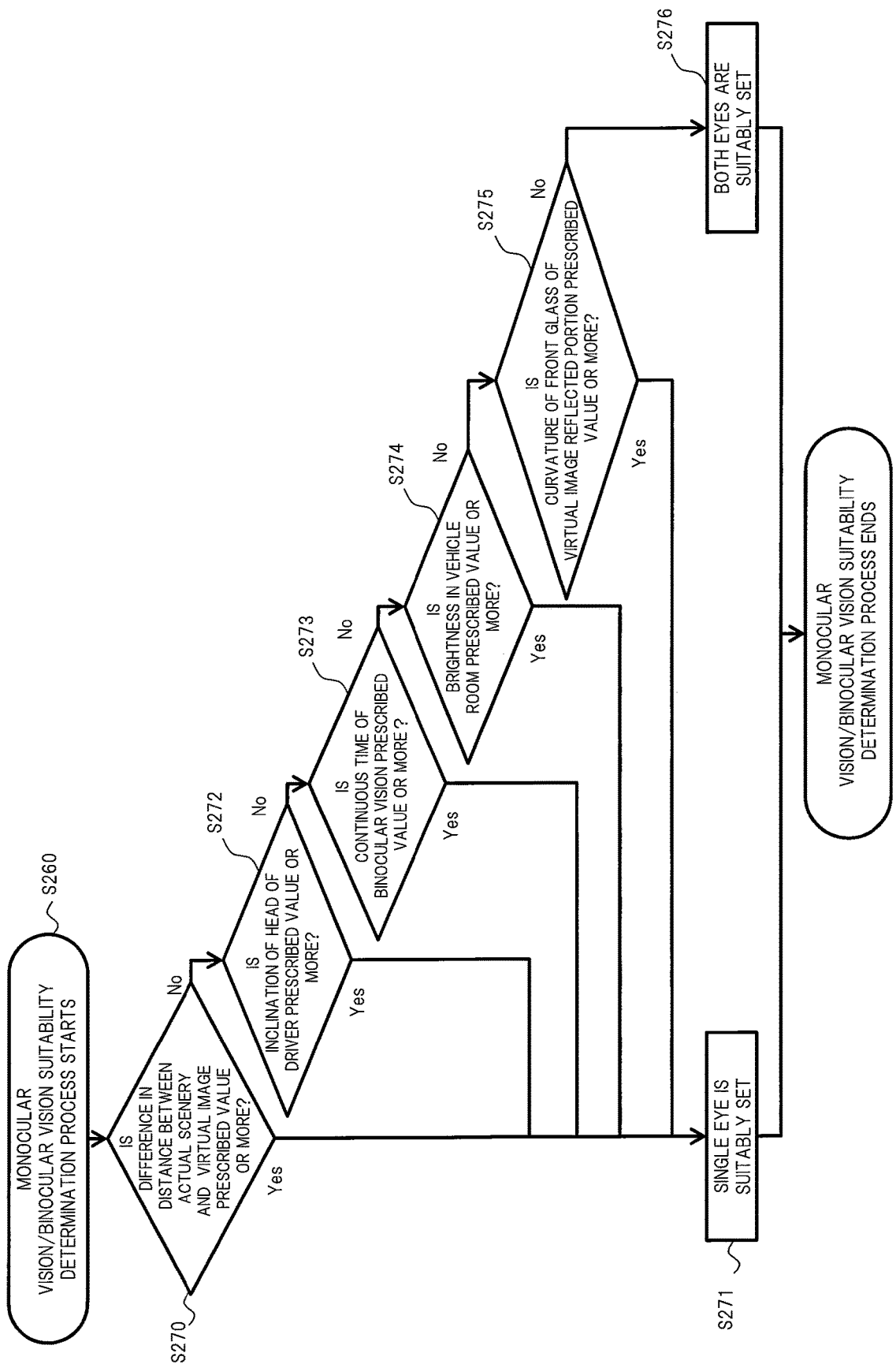

Next, detailed contents of the monocular vision/binocular vision suitability determination process (S260) described above will be determined in detail with reference to FIG. 36.

When the monocular vision/binocular vision suitability determination process starts, it is first determined whether or not difference in distance between the actual scenery (that is, the scenery seen through the windshield) and the virtual image (that is, the navigation display seen through the windshield) is a prescribed value or more (S270). When a result of the determination is "Yes," the single eye is suitably set (S271), and a series of processes ends. Note that, as apparent from the above description, this setting is taken in as the determination result of the monocular vision/binocular vision suitability determination process in the process indicated in the step S260 of FIG. 35.

Meanwhile, when the result of the determination process in the step S270 described above is "No," it is further determined whether or not the inclination of the head of the driver is a prescribed value or more (S272). When a result of the determination is "Yes," the single eye is suitably set in the step S271 described above (S271), and a series of processes ends.

On the other hand, when the result of determination process in the step S272 described above is "No," it is further determined whether or not continuous time of the binocular vision is a prescribed value or more (S273). When a result of the determination is "Yes," the single eye is suitably set in the step S271 described above (S271), and a series of processes ends.

On the other hand, when the result of determination process in the step S273 described above is "No," it is further determined whether or not brightness in the vehicle room is a prescribed value or more (S274). When a result of the determination is "Yes," the single eye is suitably set similarly to the above (S271), and a series of processes ends.

On the other hand, when the result of determination process in the step S274 described above is "No," it is further determined whether or not the curvature of the front glass (windshield) of the virtual image reflected portion is a prescribed value or more (S275). When a result of the determination is "Yes," the single eye is suitably set (S271), and a series of processes ends. On the other hand, when the result of the determination in the step S275 is "No," both eyes are suitably set (S276), and a series of processes ends. Note that this setting is also taken in as the determination result of the monocular vision/binocular vision suitability determination process in the process indicated in the step S260 of FIG. 35.

Note that it is apparent for those skilled in the art that, in the above-described determination process, for example, the distance of the actual scenery and the inclination of the head of the driver as well as the brightness in the vehicle room can be easily obtained by using an acquisition device of the vehicle information illustrated in FIG. 3 described above, such as the camera (inside the vehicle) 115 and the camera (outside the vehicle) 116.

As apparent from the above, according to the monocular vision/binocular vision control of the navigation information display described above, it is possible to achieve a head-up display apparatus capable of performing navigation information display enabling reduction of a burden of a driver even in driving for long hours.

Note that software for executing the monocular vision/binocular vision control of the navigation display described above is also, for example, stored in advance in the memory in the controller 20 constituting the head-up display apparatus of the present invention to be executed by the ECU 21 (see FIGS. 3 to 5, for example), similarly to the above.

In the foregoing, the invention made by the present inventors has been concretely described based on the embodiments. However, it is needless to say that the present invention is not limited to the foregoing embodiments and various modifications and alterations can be made within the gist of the present invention. For example, the above-described embodiment has been described in detail so that the present invention is easily understood, and is not necessarily limited to the one including all configurations described. In addition, other configurations can be added to, deleted from, or replaced with the part of the configuration of each embodiment.

INDUSTRIAL APPLICABILITY

The present invention can be used to a head-up display apparatus using AR.

EXPLANATION OF REFERENCE CHARACTERS

1 . . . AR-HUD, 2 . . . vehicle, 3 . . . windshield, 4 . . . vehicle information, 5 . . . driver, 6 . . . display region, 10 . . . vehicle information acquisition unit, 20 . . . controller, 21 . . . ECU, 22 . . . audio output unit, 23 . . . non-volatile memory, 24 . . . memory, 25 . . . light source adjusting unit, 26 . . . distortion correction unit, 27 . . . display element driver, 28 . . . display distance adjusting unit, 29 . . . mirror adjusting unit, 30 . . . video image display, 30*a* . . . projector, 30*b* . . . LCD, 31 . . . light source, 32 . . . illumination optical system, 33 . . . display element, 35 . . . HUD display region, 351 . . . navigation display (arrow), 352 . . . arrow in a different mode, 40 . . . display distance adjusting mechanism, 41*a* . . . diffuser, 41*b* . . . diffuser, 41*c* . . . movable diffuser, 42*a* . . . lens, 42*b* . . . movable lens, 43*a* . . . movable optical filter, 43*b* . . . comb-like optical filter, 50 . . . mirror driver, 51 . . . mirror, 51*a* . . . mirror, 51*b* . . . light control mirror, 52 . . . mirror, 60 . . . speaker, 101 . . . vehicle speed sensor, 102 . . . shift position sensor, 103 . . . handle steering angle sensor, 104 . . . headlight sensor, 105 . . . illuminance sensor, 106 . . . chromaticity sensor, 107 . . . distance measuring sensor, 108 . . . infrared ray sensor, 109 . . . engine start sensor, 110 . . . acceleration sensor, 111 . . . gyro sensor, 112 . . . temperature sensor, 113 . . . road-to-vehicle communication wireless receiver, 114 . . . vehicle-to-vehicle communication wireless receiver, 115 . . . camera (inside the vehicle), 116 . . . camera (outside the vehicle), 117 . . . GPS receiver, 118 . . . VICS receiver, 281 . . . functional liquid crystal film ON/OFF controller, 282 . . . lens movable unit, 283 . . . light control mirror ON/OFF controller, 284 . . . diffuser movable unit, 285 . . . optical filter movable unit, 401 . . . functional liquid crystal film, 402 . . . lens movable mechanism, 403 . . . light control mirror, 404 . . . diffuser movable mechanism, 405 . . . optical filter movable mechanism.

The invention claimed is:

1. A head-up display apparatus displaying a virtual image to be overlapped with scenery in front of a vehicle with respect to a driver by projecting a video image onto a windshield of the vehicle, the head-up display apparatus comprising:
   a vehicle information acquisition unit configured to acquire various kinds of vehicle information which can be detected by the vehicle;
   a controller configured to control display of the video image based on the vehicle information acquired by the vehicle information acquisition unit;
   a video image display configured to form the video image based on an instruction from the controller;
   a mirror configured to reflect the video image formed by the video image display to project onto the windshield;
   a mirror driver configured to change an angle of the mirror based on an instruction from the controller; and
   a display distance adjusting mechanism configured to adjust a display distance of the virtual image with respect to the driver,
   wherein the controller adjusts the angle of the mirror via the mirror driver based on the vehicle information such that the virtual image can be displayed with respect to the driver to be overlapped with the scenery.

2. The head-up display apparatus according to claim 1, wherein the controller:
   acquires information relating to a first grade of a forward road as the vehicle information from the vehicle information acquisition unit, and information relating to a second grade of a road of a current place;
   adjusts, when the first grade is larger than the second grade by a predetermined threshold value or more, the angle of the mirror via the mirror driver such that a display position of the virtual image moves in an upward direction; and
   adjusts, when the second grade is larger than the first grade by a predetermined threshold value or more, the angle of the mirror via the mirror driver such that the display position of the virtual image moves in a downward direction.

3. The head-up display apparatus according to claim 2, wherein the controller adjusts the angle of the mirror via the mirror driver only when a state in which the first grade is larger than the second grade by the predetermined threshold value or more, or a state in which the second grade is larger than the first grade by the predetermined threshold value or more, continues for a predetermined period of time or more.

4. The head-up display apparatus according to claim 1, wherein the controller:
   acquires information relating to a speed of the vehicle as the vehicle information from the vehicle information acquisition unit; and
   adjusts, when the speed is larger than a predetermined threshold value, the angle of the mirror via the mirror driver such that a display position of the virtual image moves in an upward direction.

5. The head-up display apparatus according to claim 1, wherein the controller:
   acquires information relating to a height position of eyes of the driver as the vehicle information from the vehicle information acquisition unit;
   adjusts, when the height position is higher than a predetermined threshold value, the angle of the mirror via the mirror driver such that a display position of the virtual image moves in an upward direction; and
   adjusts, when the height position is lower than the predetermined threshold value, the angle of the mirror via the mirror driver such that the display position of the virtual image moves in a downward direction.

6. The head-up display apparatus according to claim 1, wherein the controller:
   acquires information relating to a vibration amount of the vehicle as the vehicle information from the vehicle information acquisition unit; and
   offsets the video image in a display region of the video image in accordance with the vibration amount.

7. The head-up display apparatus according to claim 1, wherein the controller further displays the navigation information displayed to be overlapped with the scenery as the virtual image in a display region thereof in a different display mode in accordance with a road shape.

8. The head-up display apparatus according to claim 7, wherein the different display mode in accordance with the road shape includes a position in the display region.

9. The head-up display apparatus according to claim 1, wherein the controller further displays the navigation information displayed to be overlapped with the scenery as the virtual image by monocular vision/binocular vision control based on a predetermined condition.

10. The head-up display apparatus according to claim 9, further comprising:
   means configured to change a size/shape of an eye box between the video image display and the windshield,
   wherein the monocular vision/binocular vision control of the controller is executed by changing the size/shape of the eye box.

11. The head-up display apparatus according to claim 10, wherein the means configured to change the size or the shape of the eye box is a functional liquid crystal film disposed on a dashboard of the vehicle.

* * * * *